(12) United States Patent
Kajino et al.

(10) Patent No.: US 10,562,416 B2
(45) Date of Patent: Feb. 18, 2020

(54) LIFTER DEVICE

(71) Applicant: TOYOTA BOSHOKU KABUSHIKI KAISHA, Aichi-ken (JP)

(72) Inventors: Yusuke Kajino, Aichi-ken (JP); Yasuaki Suzuki, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/117,805

(22) Filed: Aug. 30, 2018

(65) Prior Publication Data

US 2019/0070982 A1 Mar. 7, 2019

(30) Foreign Application Priority Data

Sep. 5, 2017 (JP) ................................. 2017-170481

(51) Int. Cl.
*F16M 13/00* (2006.01)
*B60N 2/16* (2006.01)

(52) U.S. Cl.
CPC ............. *B60N 2/167* (2013.01); *B60N 2/165* (2013.01); *B60N 2/1615* (2013.01); *B60N 2/1685* (2013.01)

(58) Field of Classification Search
CPC ...... B60N 2/168; B60N 2/165; B60N 2/0296; B60N 2/16
See application file for complete search history.

(56) References Cited

U.S. PATENT DOCUMENTS

| 6,666,423 | B1* | 12/2003 | Nemoto | B60N 2/1615 248/396 |
| 7,182,196 | B2* | 2/2007 | Weber | B60N 2/16 192/223.1 |
| 8,496,098 | B1* | 7/2013 | Napau | B60N 2/165 192/15 |
| 2009/0026791 | A1* | 1/2009 | Ishijima | B60N 2/0296 296/65.18 |
| 2017/0088018 | A1 | 3/2017 | Suzuki | |

FOREIGN PATENT DOCUMENTS

JP 2017-65484 4/2017

\* cited by examiner

*Primary Examiner* — Amy J. Sterling
(74) *Attorney, Agent, or Firm* — Greenblum & Bernstein, P.L.C.

(57) ABSTRACT

A lifter device including: an input member configured to be rotated about a rotation shaft in synchronization with an operation handle and to input an operation force of the operation handle to a rotation drive mechanism and a lock mechanism; and a fixing member slidably fixing the input member to a support member rotatably supporting the rotation shaft.

5 Claims, 28 Drawing Sheets

LIFTER DEVICE

CROSS-REFERENCE TO RELATED APPLICATIONS

This application claims priority from Japanese Patent Application No. 2017-170481 filed on Sep. 5, 2017, the entire contents of which are incorporated herein by reference.

TECHNICAL FIELD

The disclosure relates to a lifter device used for adjusting the height of a seat of an automobile or the like.

BACKGROUND

A lifter device used for a seat of an automobile or the like is adapted to adjust the height of a seat cushion with respect to a floor by operating an operation handle. Various types of lifter devices have been developed. According to the invention disclosed in JP-A-2017-65484, the height of a seat is adjusted by swinging one end of an operation handle about another end thereof in an upper-lower direction. Accordingly, the height is increased by an operation amount for each operation when the operation handle is operated upward from a neutral position. Such operation of the operation handle is repeated until a sitting person reaches a desired height. Meanwhile, when the operation handle is operated downward from the neutral position, a lock mechanism is released from a locked state and the height is continuously lowered.

In the case of the invention disclosed in JP-A-2017-65484, the operation handle is supported by a rotation shaft at a rotation center thereof in a radial direction. However, the operation handle is not supported effectively in a thrust direction since components are stacked only.

As a result, the operation handle is stably rotated about the rotation shaft in the rotation direction, whereas the operation handle may wobble during operation in a direction orthogonal to the rotation direction, and the operation thereof is not stable. This is because, as described above, a gap may be created at the rotation center of the operation handle due to dimensional errors or variations during assembly of the stacked components in the thrust direction, and the operation of the operation handle becomes unstable in the thrust direction due to influence of the gap even when the gap is small. For this reason, an operation end of the operation handle may wobble in the thrust direction of the rotation shaft when the operation handle is swung in the upper-lower direction, which may make an operator feel that the quality of the product is poor.

SUMMARY

An object of the disclosure is, in a lifter device that performs height adjusting of a seat via swinging an operation handle, to support the operation handle in a thrust direction of a rotation shaft by fixing the operation handle slidably to a support member of the lifter device, and to suppress wobble of the operation handle in the thrust direction of the rotating shaft during operation.

According to an aspect of the disclosure, there is provided a lifter device including: a pinion gear meshing with an input gear of a link mechanism for lifting and lowering a seat; and a rotation control device configured to control rotation of the pinion gear, the rotation control device including: a rotation shaft configured to rotate in synchronization with the pinion gear; a support member rotatably supporting the rotation shaft; a rotation drive mechanism provided to the rotation shaft, the rotation drive mechanism being configured to rotationally drive the rotation shaft in a lifting direction when an operation handle for lifting and lowering the seat is operated to lift the seat, and to bring the rotation shaft into a freely rotatable state without rotationally driving the rotation shaft when the operation handle is operated to lower the seat; a lock mechanism provided to the rotation shaft, the lock mechanism being configured to lock the rotation of the rotation shaft at an operation end position of the operation handle when the operation handle is operated to lift the seat, and to bring the rotation shaft into a freely rotatable state without locking the rotation of the rotation shaft when the operation handle is operated to lower the seat; an input member configured to be rotated about the rotation shaft in synchronization with the operation handle, and to input an operation force of the operation handle to the rotation drive mechanism and the lock mechanism; and a fixing member slidably fixing the input member to the support member.

Accordingly, since the input member rotated in synchronization with the operation handle is fixed to the support member, the input member is stably supported by the support member in the axial direction. Accordingly, wobbling of the rotation handle in the thrust direction of the rotation shaft can be suppressed when the operation handle is swung.

DETAILED DESCRIPTION

Overall Configuration of First Embodiment

Figure 1:
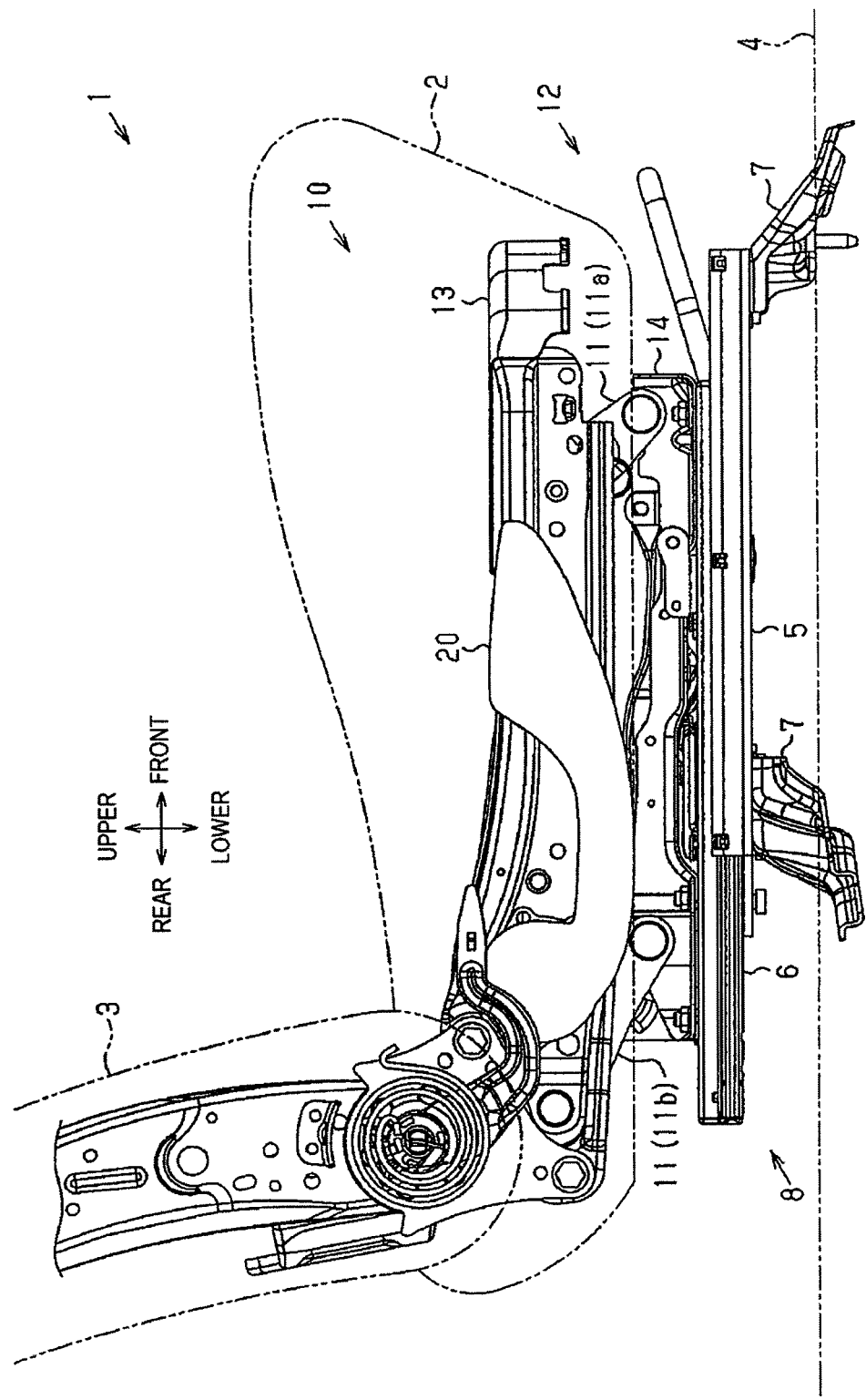
FIG. 1 is a side view of a seat to which a lifter device according to a first embodiment of the disclosure is applied.
Figure 2:
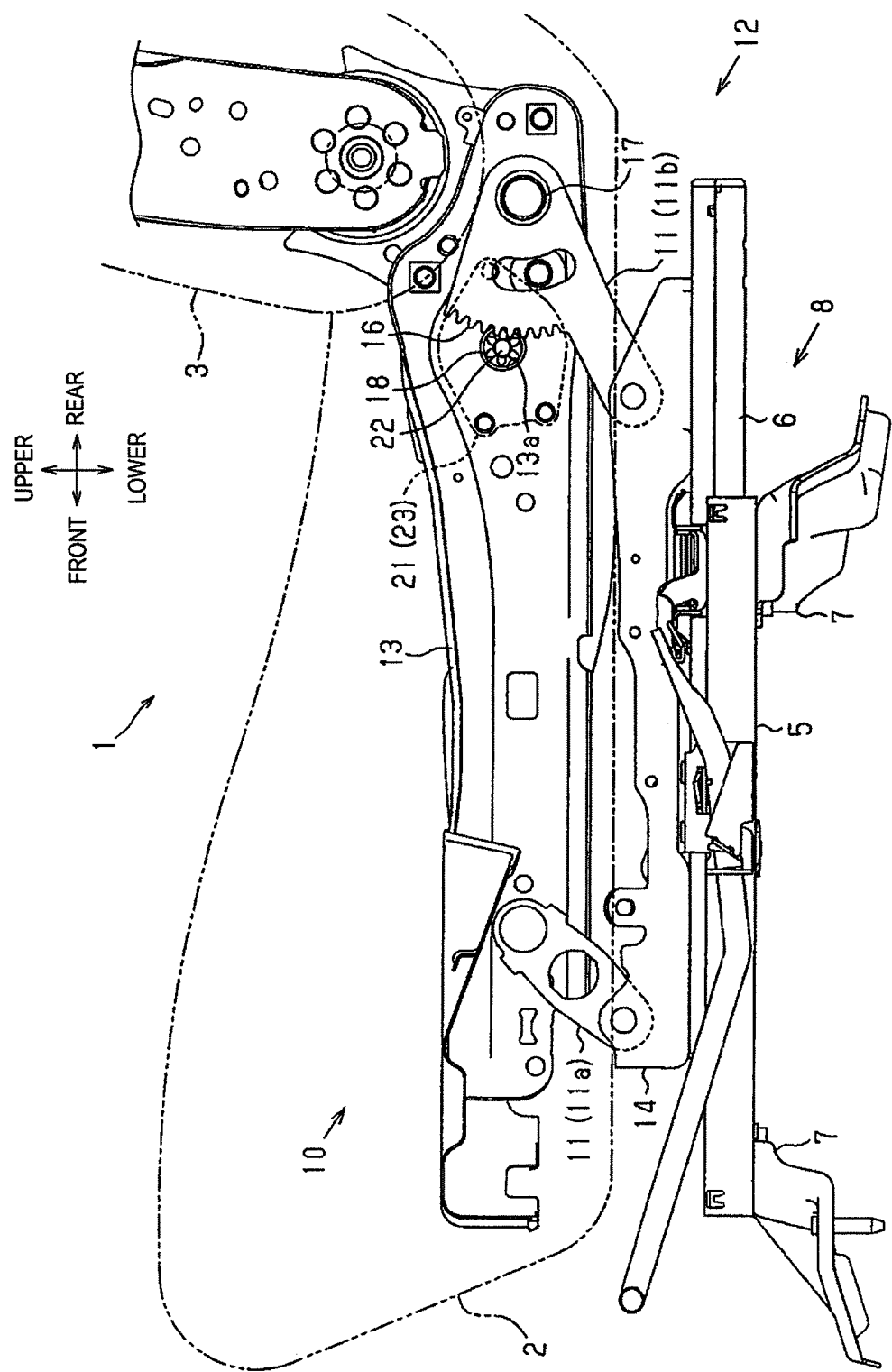
FIG. 2 is a side view of the seat as seen from inside thereof.
Figure 3:
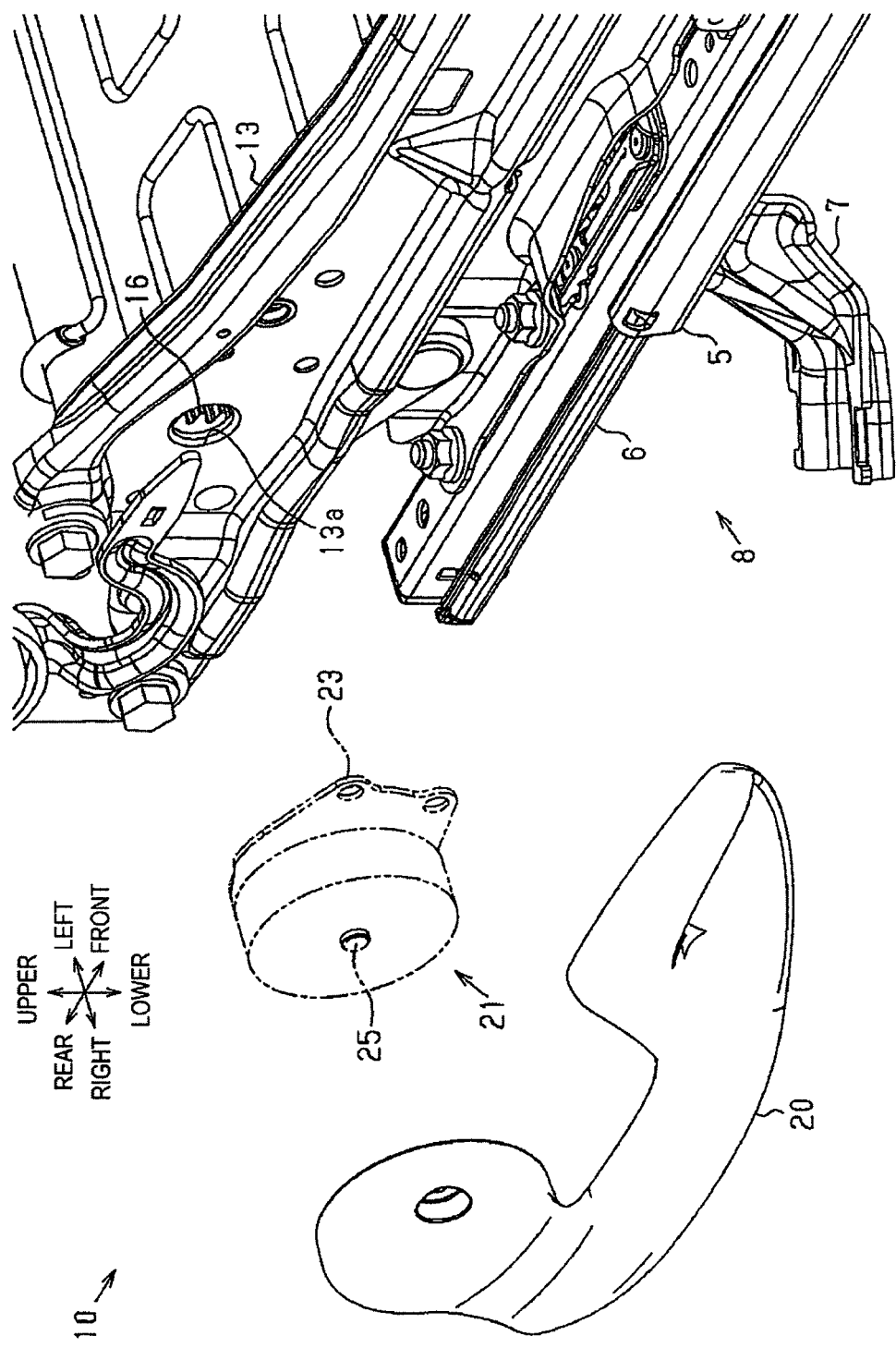
FIG. 3 is an exploded perspective view of main parts of the seat.

FIGS. 1 to 3 illustrate an automobile seat (hereinafter simply referred to as "seat") 1 to which a lifter device according to a first embodiment of the disclosure is applied. In the drawings, directions of parts in a state where the seat 1 is mounted to an automobile are indicated by arrows. Descriptions on directions are made on the basis of these directions in the following description.

As illustrated in FIG. 1, the seat 1 includes a seat back 3 serving as a backrest on a rear side of a seat cushion 2 serving as a seating part. The seat back 3 is rotatable in a front-rear direction with respect to the seat cushion 2. The seat cushion 2 includes a lifter device 10 and a seat slide device 8 at a lower part thereof and is fixed to a vehicle floor 4 via a bracket 7.

As illustrated in FIG. 2, the seat slide device 8 is known in the art and includes a pair of left and right upper rails 6 coupled to a pair of left and right lower rails 5 extending in the front-rear direction, so as to be slidable back and forth. The left and right lower rails 5 are fixedly supported by a pair of front and rear brackets 7 fixed to the floor 4, respectively. The lifter device 10 is provided above the left and right upper rails 6.

As illustrated in FIGS. 2 and 3, the lifter device 10 includes a base member 14 fixed on the upper rails 6 and a plurality of link members 11 rotatably coupled to front and rear end parts of the upper rails 6. The base member 14, together with the link members 11 and a side frame 13 that is a framework member of the seat cushion 2, constitutes a link mechanism 12 that is a four-bar linkage. Among the plurality of link members 11, a rear link 11b on a right rear side includes a sector gear (corresponding to an input gear in the disclosure) 16 and is configured to be rotated in the front-rear direction via a pinion gear 18 of a rotation control device 21. A rotation shaft of the rear link 11b on the right rear side to the side frame 13 is configured by a torque rod 17. A rear link (not illustrated) on a left rear side is also configured to be rotated in synchronization with the rear link 11b via the torque rod 17.

The side frame 13 is formed with a through-hole 13a for inserting the pinion gear 18. The rotation control device 21 is fixed to a right wall of the side frame 13 such that the pinion gear 18 is inserted into the through-hole 13a. The rotation control device 21 is rotatable forward and reversely via an operation handle 20 that is provided on a right side of the seat cushion 2 and extends in the front-rear direction. The operation handle 20 is configured such that a front end part thereof is operated to swing about a rear end part thereof in the upper-lower direction. When the operation handle 20 is rotated upward from a neutral position, the rotation control device 21 is rotated such that the rear link 11b is erected from the base member 14, and when the operation handle 20 is rotated downward from the neutral position, the rotation control device 21 is rotated such that the rear link 11b is folded on the base member 14. With the configuration of the above four-bar linkage, a front link 11a is also rotated in response to the rotation of the rear link 11b, such that the height of the seat cushion 2 from the floor 4 is adjusted in response to the operation of the operation handle 20.

<Configuration of Rotation Control Device 21 (Rotation Shaft 22 and Support Member 23)>

Figure 4:
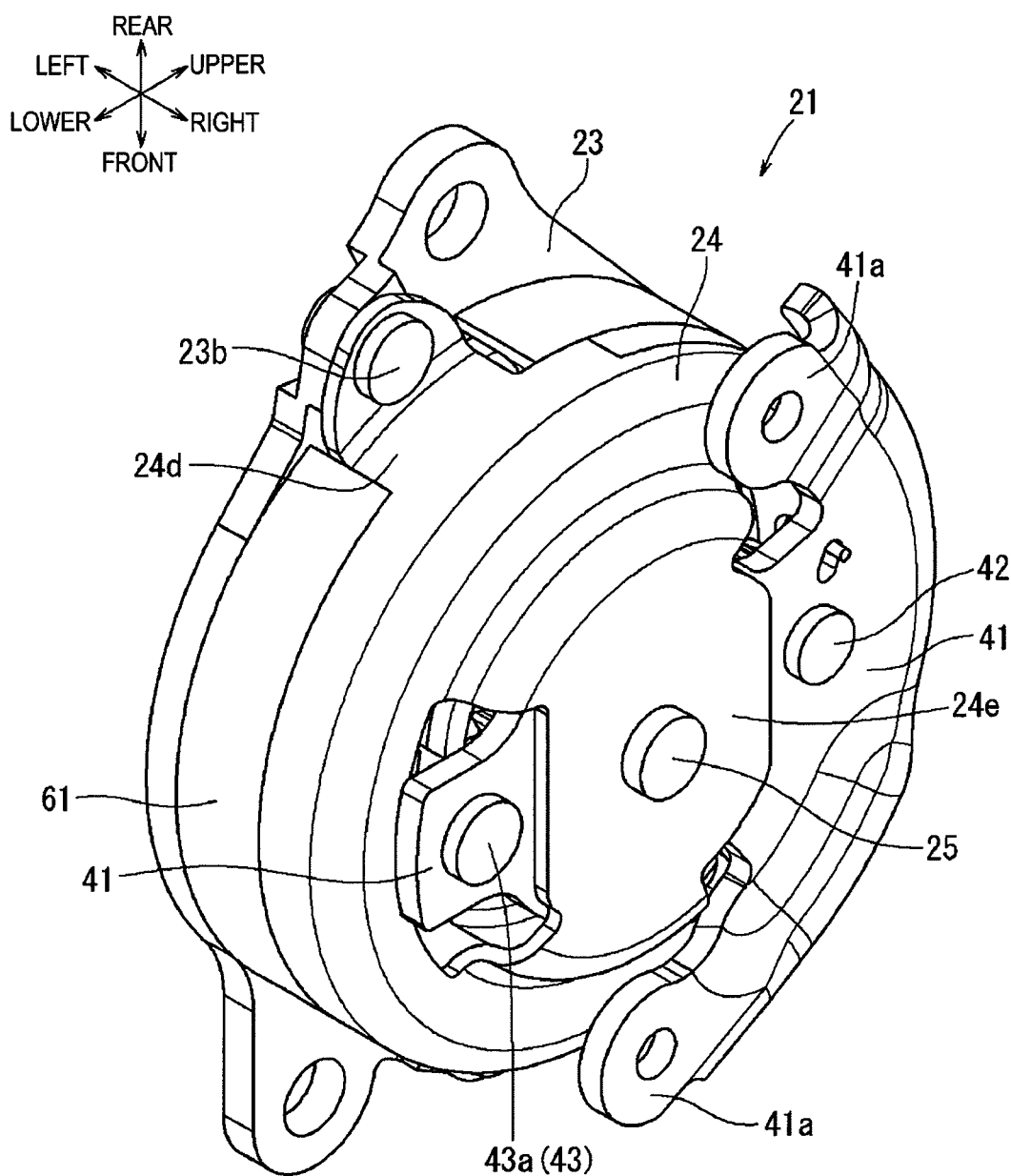
FIG. 4 is a front perspective view of a rotation control device in the first embodiment.
Figure 5:
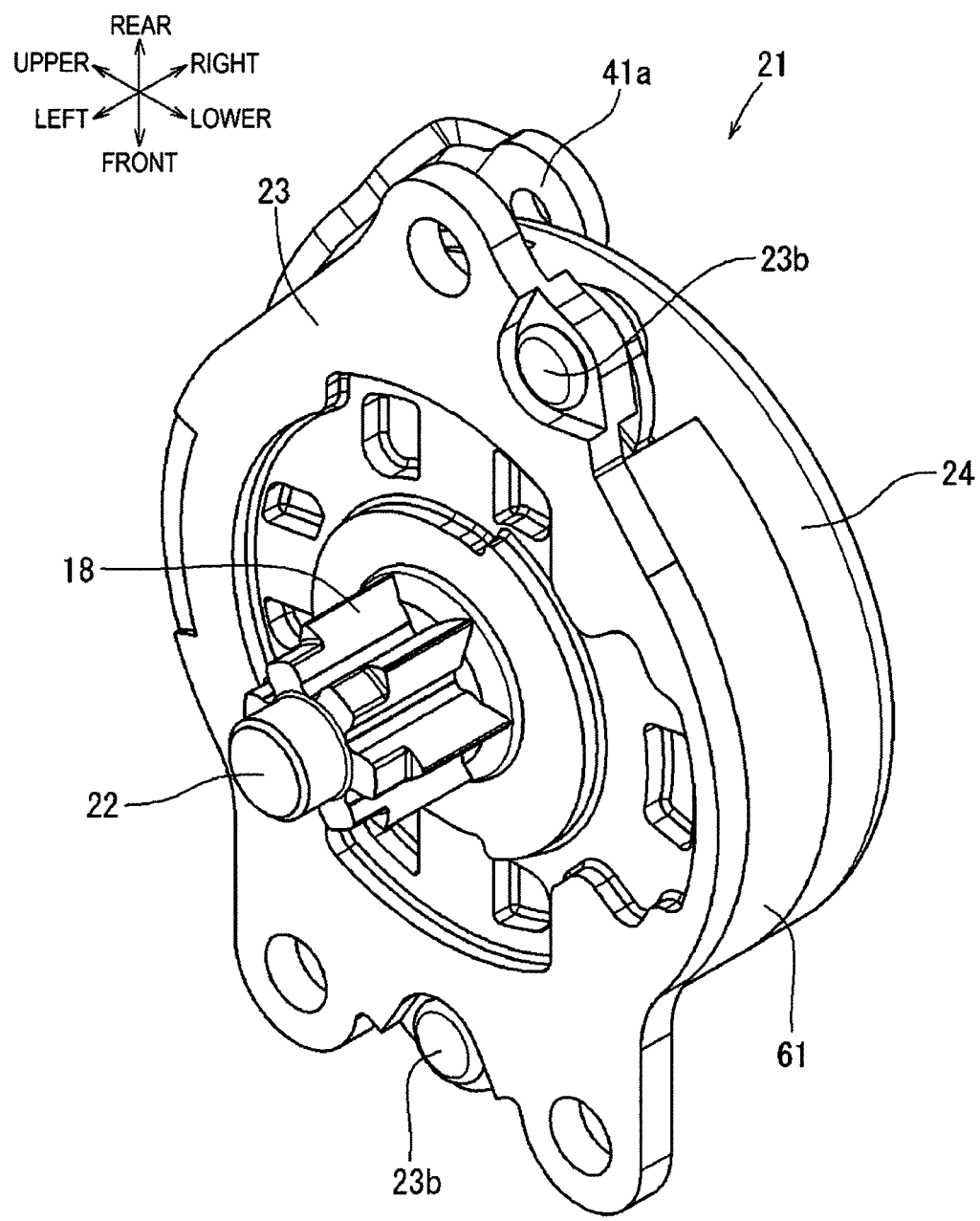
FIG. 5 is a rear perspective view of the rotation control device in the first embodiment.
Figure 6:
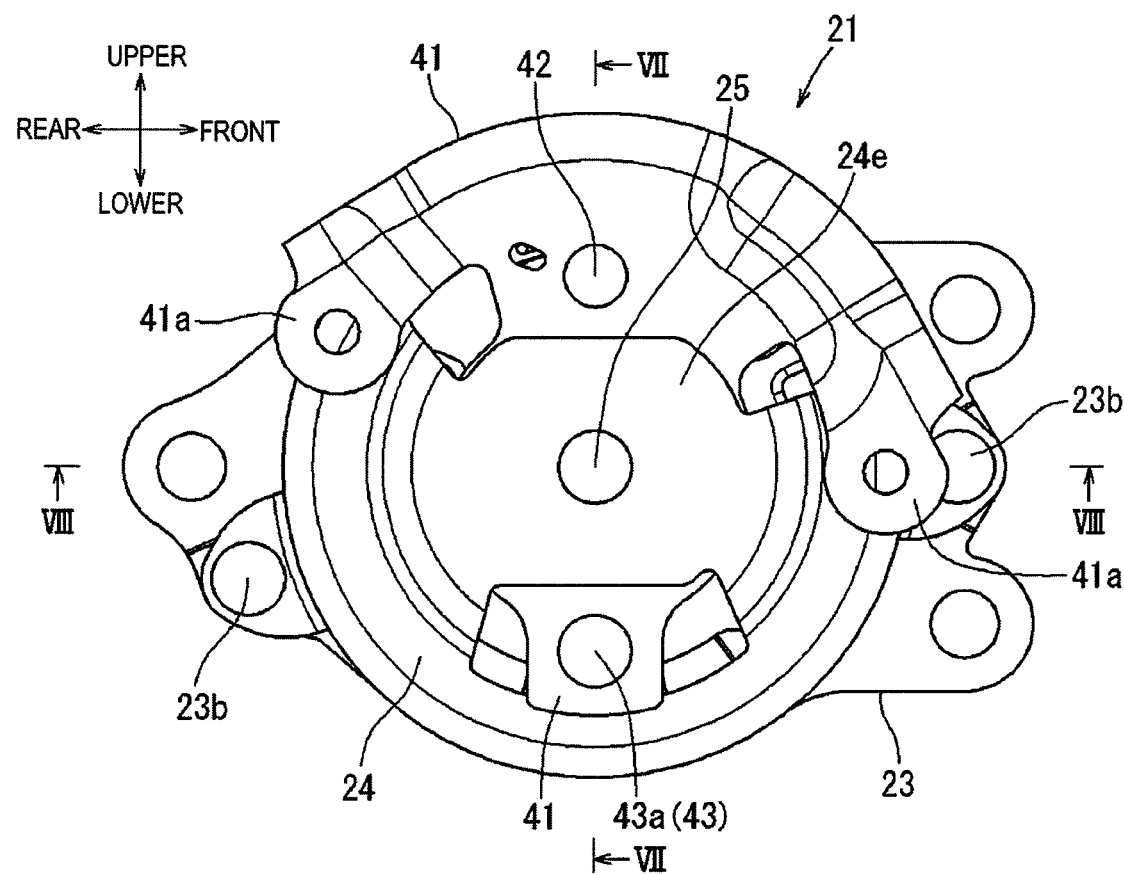
FIG. 6 is a front view of the rotation control device in the first embodiment.
Figure 7:
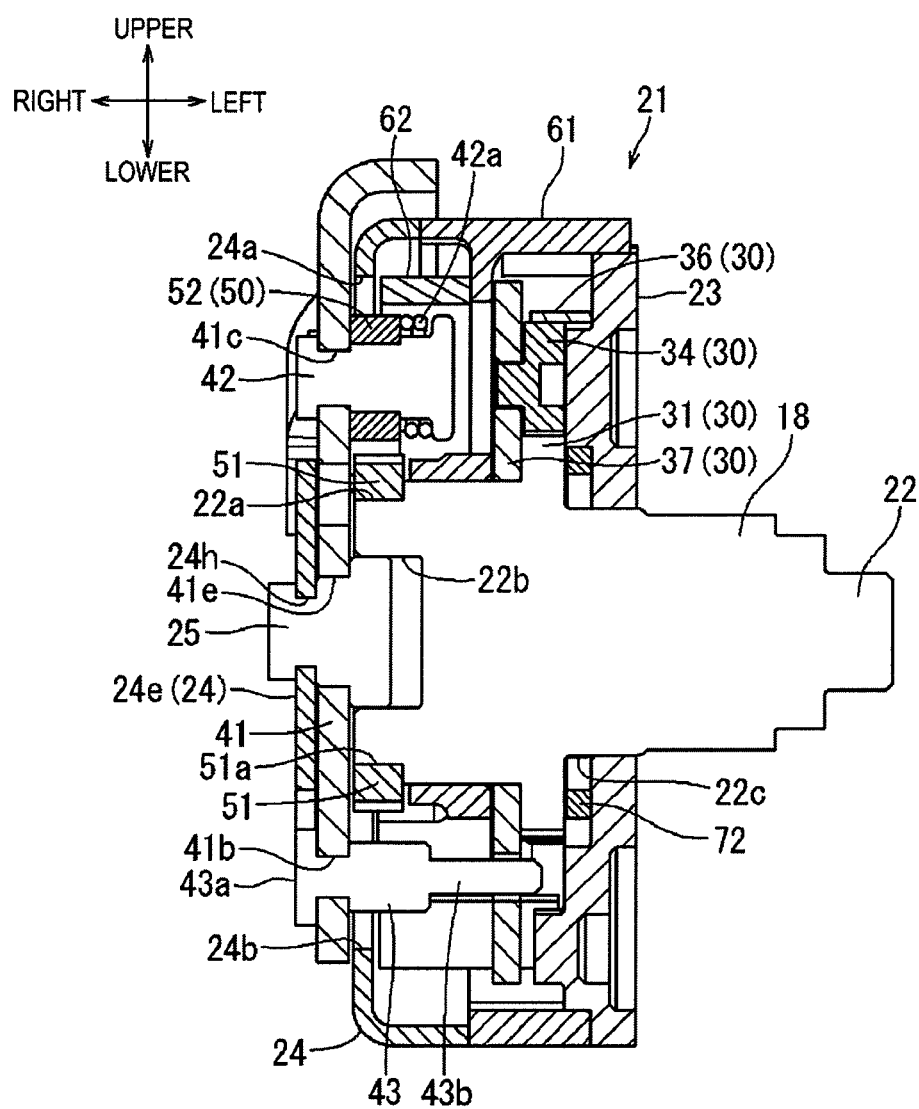
FIG. 7 is a sectional view taken along a line VII-VII in FIG. 6.

FIGS. 4 to 6 illustrate a state in which the rotation control device 21 is detached from the seat cushion 2. Hereinafter, the configuration of the rotation control device 21 is described with reference to FIGS. 4 to 13 and FIG. 20.

The rotation control device 21 is integrated in a manner that a cap-shaped cover 24 is placed on a support member 23 that is a base member with a substantially disc-shaped intermediate member 61 interposed therebetween. Two leg parts 24d of the cover 24 are crimped to through-holes 23a on the support member 23 by rivets 23b, such that the cover 24 is fixed to the support member 23 together with the intermediate member 61. A rotation shaft 22 is configured to pass through centers of the support member 23 and the intermediate member 61. Here, a combination of the support member 23 and the cover 24 constitutes a container-like support member of the disclosure.

Figure 8:
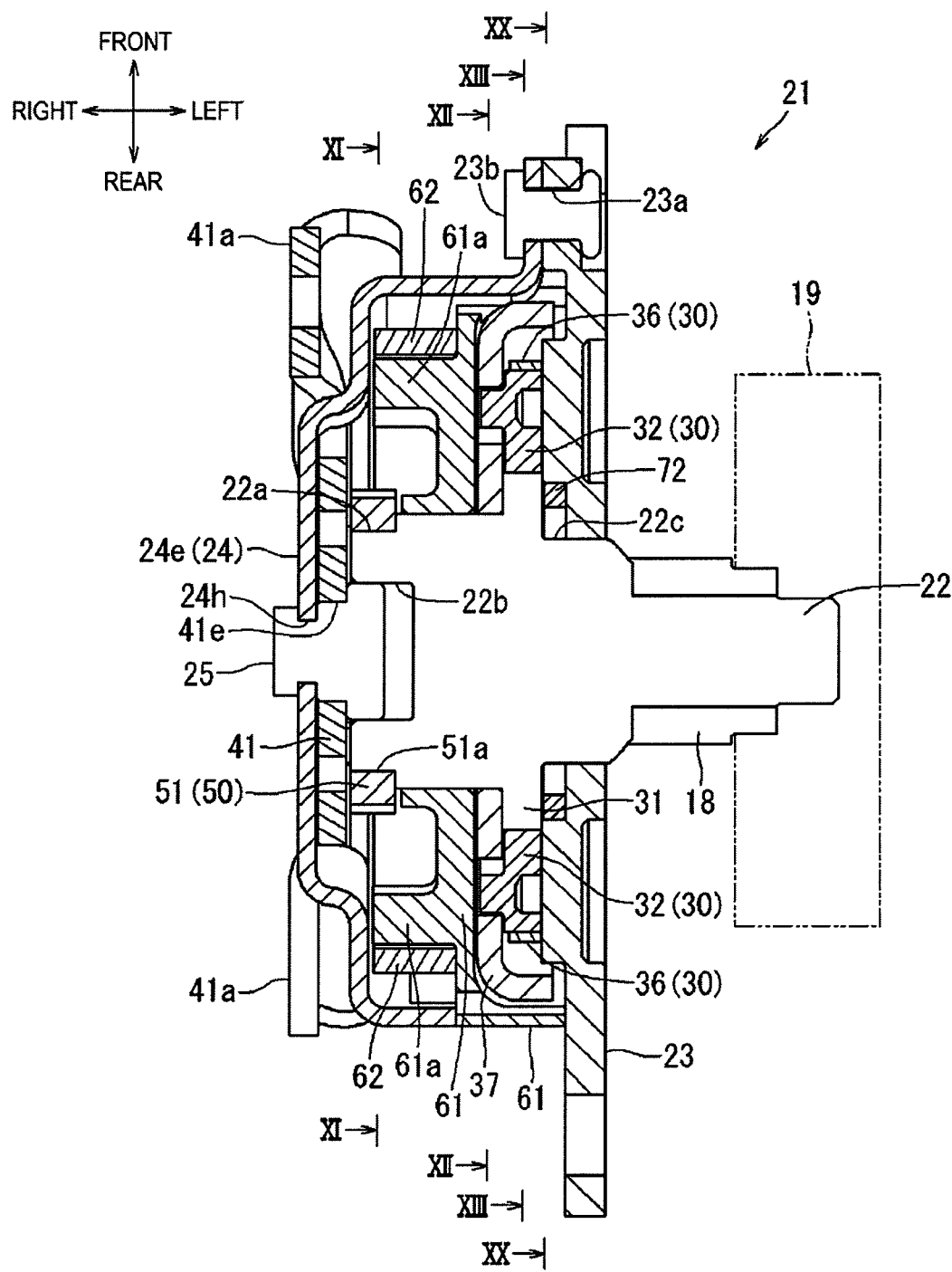
FIG. 8 is a sectional view taken along a line VIII-VIII in FIG. 6.
Figure 9:
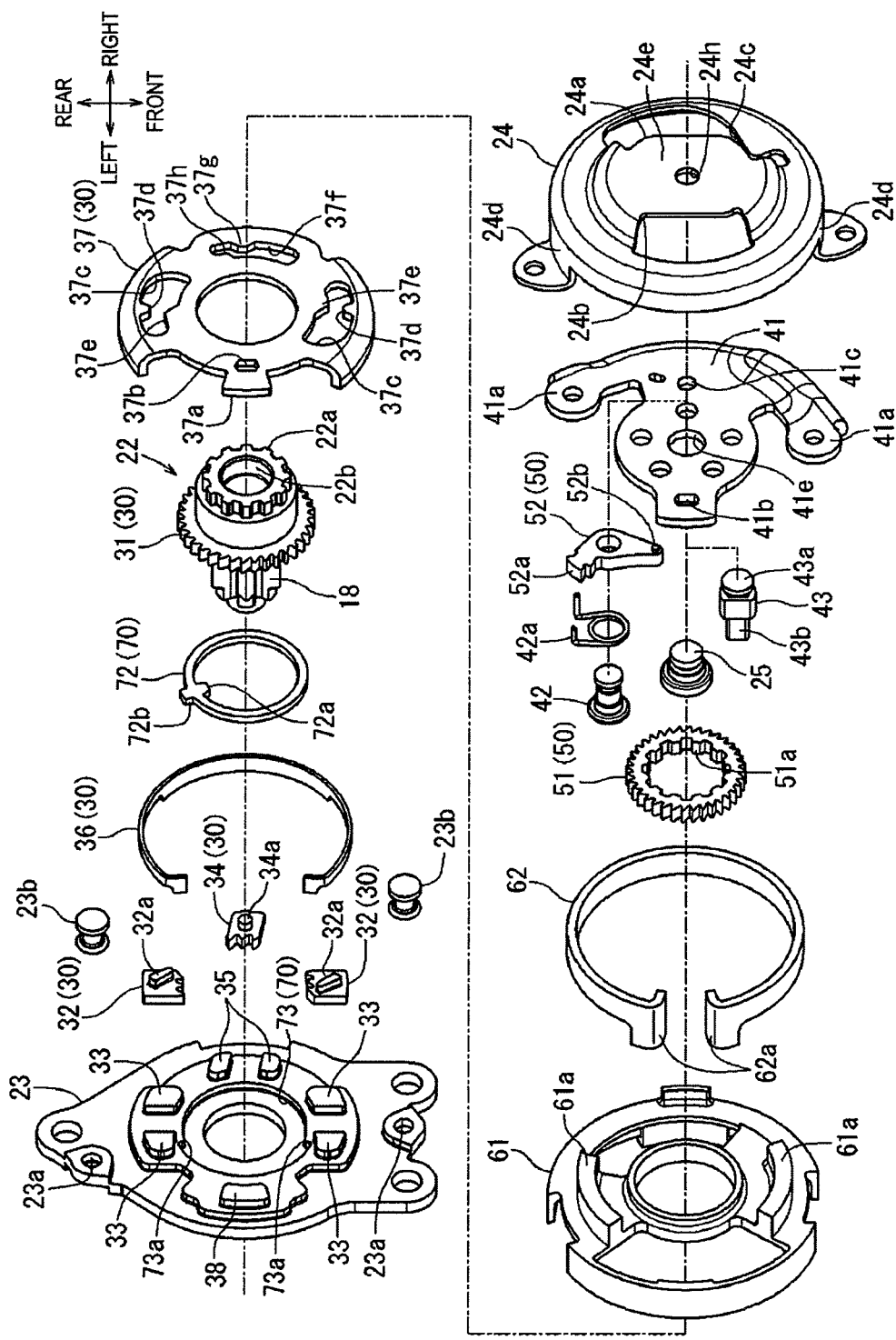
FIG. 9 is an exploded perspective view of the rotation control device in the first embodiment.
Figure 10:
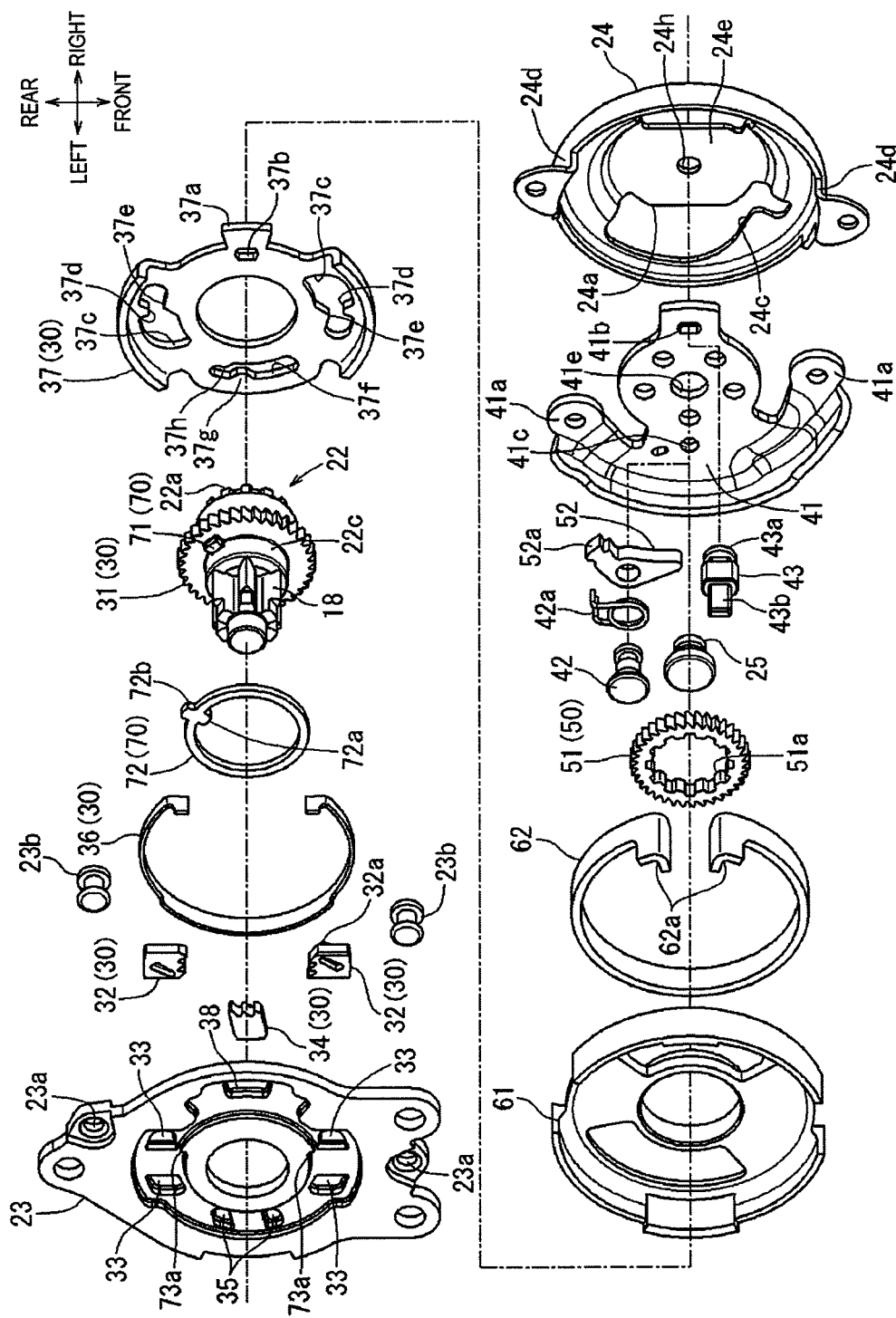
FIG. 10 is an exploded perspective view of the rotation control device in the first embodiment seen from an angle different from FIG. 9.

The rotation shaft 22 is integrally formed with the pinion gear 18 at a left end part, and a ratchet wheel 31 is integrally formed between both ends thereof. Further, a spline 22a is formed at an end part of the rotation shaft 22 on a right side of the ratchet wheel 31. The pinion gear 18 is assembled to protrude from the support member 23. As illustrated in FIG. 8, a damper 19 is coupled to the rotation shaft 22. As is well known, the damper 19 is adapted to suppress a sudden change in a rotational speed of the rotation shaft 22.

<Configuration of Rotation Control Device 21 (Rotation Drive Mechanism 50)>

Arc-shaped openings 24a, 24b are formed in upper and lower parts of a right central part of the cover 24. A substantially T-shaped flat input member 41 is inserted in the openings 24a, 24b are inserted by a substantially T-shaped flat input member 41. Therefore, the input member 41 is disposed from inside to outside of a container defined by the support member 23 and the cover 24. As a result, a top plate part 24e of the cover 24 and a central part of the input member 41 overlap each other. A caulking pin 25 is inserted into a through hole 24h of the top plate part 24e and a through hole 41e of the input member 41, such that the input member 41 is fixed to the top plate part 24e so as to be rotatable about the caulking pin 25. That is, the caulking pin 25 is crimped to the top plate part 24e at a right end, and the input member 41 is rotatably held between a left step part of the caulking pin 25 and the top plate part 24e. The caulking pin 25 is located on a rotation center line of the rotation shaft 22. A fitting hole 22b is formed inside the spline 22a of the rotation shaft 22 to receive the caulking pin 25 in a fitted state. Therefore, the rotation shaft 22 is rotatably supported between the support member 23 and the cover 24 via the caulking pin 25. The caulking pin 25 corresponds to a fixing member of the disclosure.

End parts of the input member 41 protrudes from the openings 24a, 24b of the cover 24, and coupling parts 41a on both upper ends of the input member 41 are coupled to the operation handle 20. Therefore, the input member 41 is rotated about the caulking pin 25 in the operation direction thereof when the operation handle 20 is operated in the upward or the downward direction. By inserting the input member 41 into the openings 24a, 24b in this manner, a rotational operation angle of the operation handle 20 is restricted.

A coupling part 41c, which is a through hole, is formed on an outer peripheral side of the through hole 41e serving as the rotation center of the input member 41. A drive lever 52 is coupled to the coupling part 41c via a caulking pin 42, and is rotatably coupled to a left surface of the input member 41 with the caulking pin 42 as a center. The drive lever 52 corresponds to a drive member of the disclosure.

A ratchet wheel 51 is provided adjacent to the drive lever 52 and is coupled to the spline 22a of the rotation shaft 22 in the rotation direction via a spline hole 51a formed on an inner peripheral side of the ratchet wheel 51. Accordingly, the ratchet wheel 51 and the rotation shaft 22 are rotated in synchronization.

An engaging end part 52a engaging with a claw of the ratchet wheel 51 is formed at a rear end part of the driving lever 52. An engaging part 52b engaging with an engaging piece 24c formed at the opening 24a of the cover 24 is formed at a front end part of the driving lever 52 to protrude to a right side. Further, a spring 42a is hooked between the drive lever 52 and the caulking pin 42, such that the engaging end part 52a is biased toward a side where it engages with the claw of the ratchet wheel 51. The ratchet wheel 51 and the driving lever 52 constitute a rotation drive mechanism 50 of the disclosure.

<Configuration of Rotation Control Device 21 (Lock Mechanism 30)>

On a right surface of the support member 23 and around the ratchet wheel 31, a pair of main pawls 32 and a sub-pawl 34 are disposed in parallel to be able to engage with a claw of the ratchet wheel 31 provided on an outer periphery thereof. The pair of main pawls 32 is disposed at front and rear positions on two sides with the rotation shaft 22 sandwiched therebetween, and the sub-pawl 34 is disposed at an intermediate part of the pair of main pawls 32. The pair of main pawls 32 and the sub-pawl 34 are sandwiched between a pair of guide parts 33, 35 each provided on the support member 23. The pair of main pawls 32 and the sub-pawl 34 are held by the pair of guide parts 33, 35 such that they are prevented from moving in the rotation direction of the rotation shaft 22 and are movable in the radial direction of the rotation shaft 22. Therefore, the pair of main pawls 32 and the sub-pawl 34 are movable between a position where they engage with the claw of the ratchet wheel 31 and a position where the engagement is released.

An annular ring spring 36 is disposed on an outer peripheral side of the pair of main pawls 32 and the sub-pawl 34 and biases the pawls 32, 34 in a direction to engage with the claw of the ratchet wheel 31. Further, engaging protrusions 32a, 34a are formed to protrude on right surfaces of the pair of main pawls 32 and the sub-pawl 34.

A pawl operating member 37 is provided, between the support member 23 and the intermediate member 61, at a position where it covers the pair of main pawls 32 and the sub-pawl 34 from a right side. The pawl operating member 37 includes guide grooves 37c, 37f corresponding to the pawls 32, 34 and receiving the engaging protrusions 32a, 34a. Further, a projection 37a extending in the radial direction of the rotation shaft 22 is formed on a side of the pawl operating member 37 opposite to the guide groove 37f with the rotation shaft 22 sandwiched therebetween. A coupling part 37b, which is a through hole, is formed at a root part of the projection 37a to the pawl operating member 37.

On a lower end part of the input member 41, a protruding pin 43 protruding leftward is coupled to the coupling part 41b via a caulking part 43a. A tip end part 43b of the protruding pin 43 penetrates the intermediate member 61 and is coupled to the through hole serving as the coupling part 37b of the pawl operating member 37. Therefore, the pawl operating member 37 is rotated via the protruding pin 43 when the input member 41 is rotated, and is allowed to move between the position where the pawls 32, 34 engage with the claw of the ratchet wheel 31 and the position where the engagement is released. In order to move the pawls 32, 34 by the rotation of the pawl operating member 37, engaging projections 37d, 37e, 37g, 37h that protrude toward inner sides of the guide grooves 37c, 37f, respectively, are formed in the guide grooves 37c, 37f.

The ratchet wheel 31, the pawls 32, 34, the ring spring 36, and the pawl operating member 37 constitute a lock mechanism 30 of the disclosure. The protruding pin 43 corresponds to a lock control member of the disclosure.

<Configuration of Rotation Control Device 21 (Stopper 70)>

An outer peripheral surface part 22c is formed on a left side of the ratchet wheel 31 and on a right side of the pinion gear 18. The outer peripheral surface part 22c is coaxial with the rotation shaft 22 and has a diameter smaller than that of the ratchet wheel 31 and larger than that of the pinion gear 18. Further, a projection 71 is integrally formed to straddle an outer peripheral surface part 22c and a left wall surface of the ratchet wheel 31.

Meanwhile, on a right surface of the support member 23 and on an inner diameter side of the guide parts 33, 35, a circular guide recess 73 is formed along the outer peripheral surface part 22c of the rotation shaft 22 by embossing the support member 23 to a left side. The guide recess 73 is formed by two circles having different diameters, in which a lower circle has a diameter larger than that of an upper circle. As a result, a stepped difference is formed at a boundary part between the two circles having different diameters, and contact surface parts 73a are formed in a stepped part.

Figure 20:
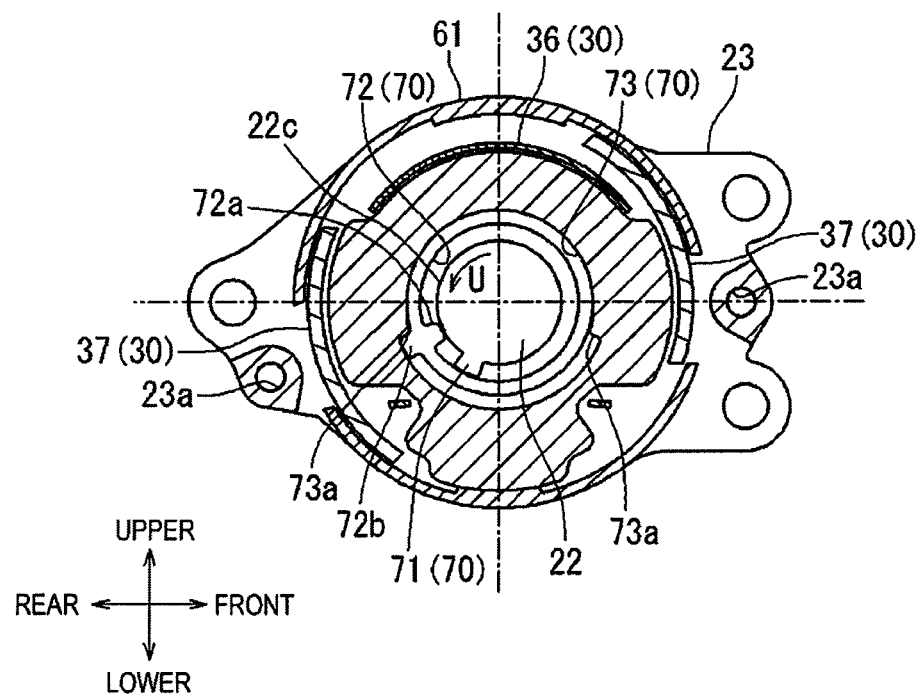
FIG. 20 is a sectional view taken along a line XX-XX in FIG. 8 illustrating the state in which the operation handle is operated to the lifting side by the first angle.

An annular ring 72 is fitted into the guide recess 73 so as to be rotatable within the guide recess 73. The ring 72 is positioned on an outer peripheral side of the outer peripheral surface part 22c. On a part of the circumference of the ring 72, a first engaging part 72a is integrally formed and protrudes inward in a radial direction, and a second engaging part 72b is integrally formed and protrudes outward in the radial direction. As illustrated in FIG. 20, when the ring 72 is rotated, the first engaging part 72a slides on the outer peripheral surface part 22c and engages with the projection 71 in the rotation direction. Further, when the ring 72 is rotated, the second engaging part 72b slides along the large-diameter circle of the guide recess 73 and engages with the contact surface parts 73a in the rotation direction.

<Configuration of Rotation Control Device 21 (Alignment of Pawl Operating Member 37)>

At a position located on a lower side part of the support member 23 and facing the projection 37a of the pawl operating member 37, a projection 38 having a size corresponding to the projection 37a as a whole is formed by embossing a plate material of the support member 23 from the left side. Further, a ring spring 62 is provided on a right surface of the intermediate member 61. The ring spring 62 has an open ring shape that is partially cut off, and a spring force is applied thereto in a direction to contract an inner diameter thereof. A pair of arc walls 61a is formed on a right surface of the intermediate member 61 and on a circle concentric with the rotation shaft 22, such that the ring spring 62 is held on an outer peripheral side of the arc walls 61a. An opening end part of the ring spring 62 located at the cut-off part is configured to extend to the left side (to the support member 23) to form extending end parts 62a. Tip ends (left ends) of the extending end parts 62a are in contact with a surface of the support member 23, and the projection 38 and the projection 37a are fitted between the extending end parts 62a. Therefore, the projection 37a is biased to be aligned to a position facing the projection 38 by a spring force of the ring spring 62. That is, in a state where the pawl operating member 37 is not rotated by the operation handle 20, a rotation angle thereof coincides with the projection 38 to define a reference position. At this time, a position of the operation handle 20 becomes the neutral position.

<Operation of Rotation Control Device 21>

Hereinafter, height adjustment operation of the seat cushion 2 via the rotation control device 21 is described with reference to FIGS. 11 to 22.

Figure 11:
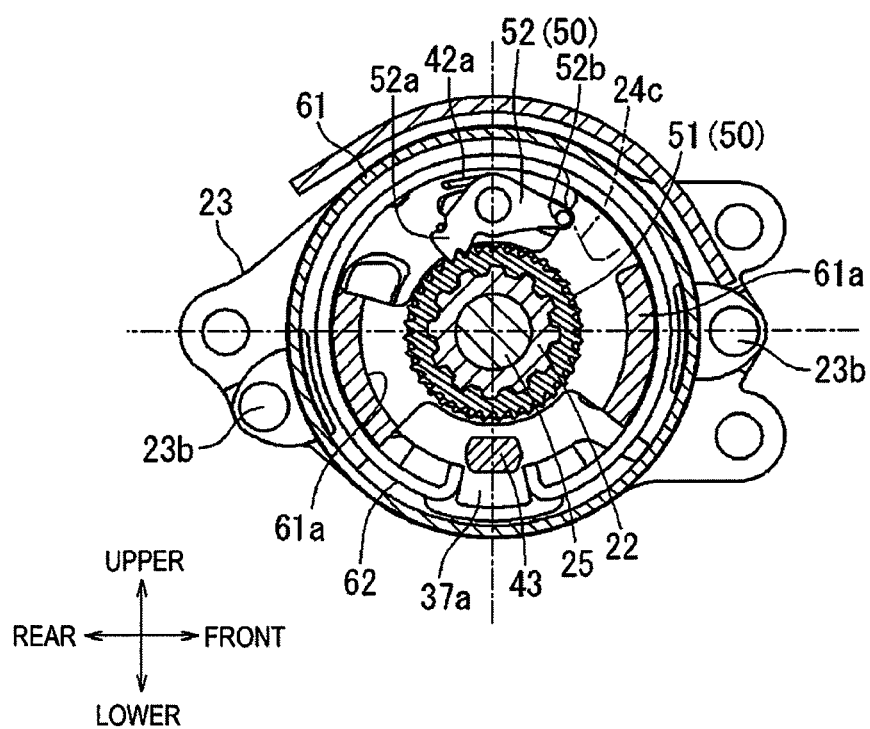
FIG. 11 is a sectional view taken along a line XI-XI in FIG. 8.
Figure 12:
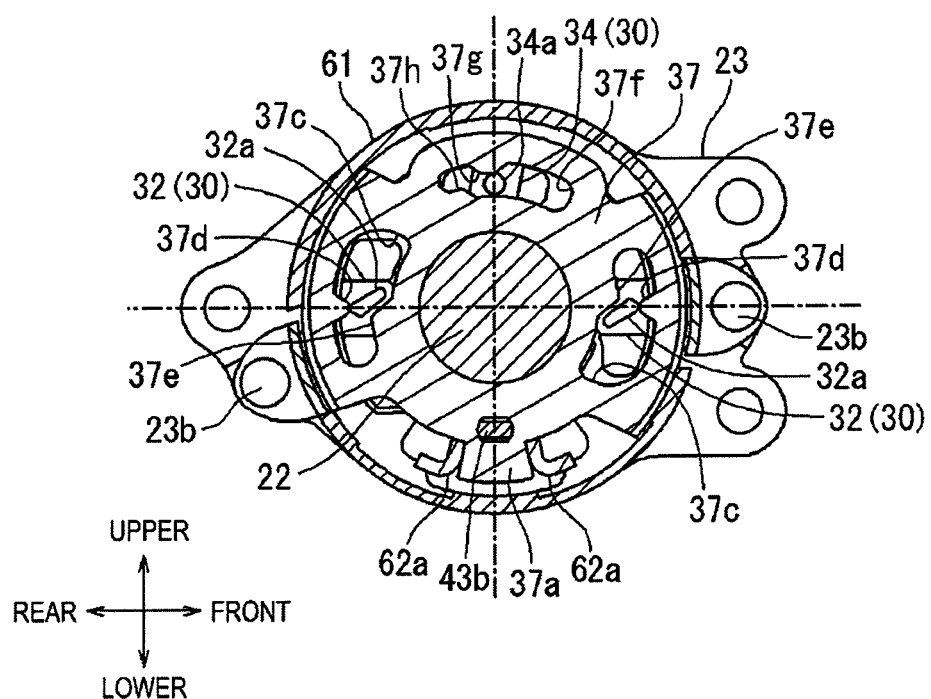
FIG. 12 is a sectional view taken along a line XII-XII in FIG. 8.
Figure 13:
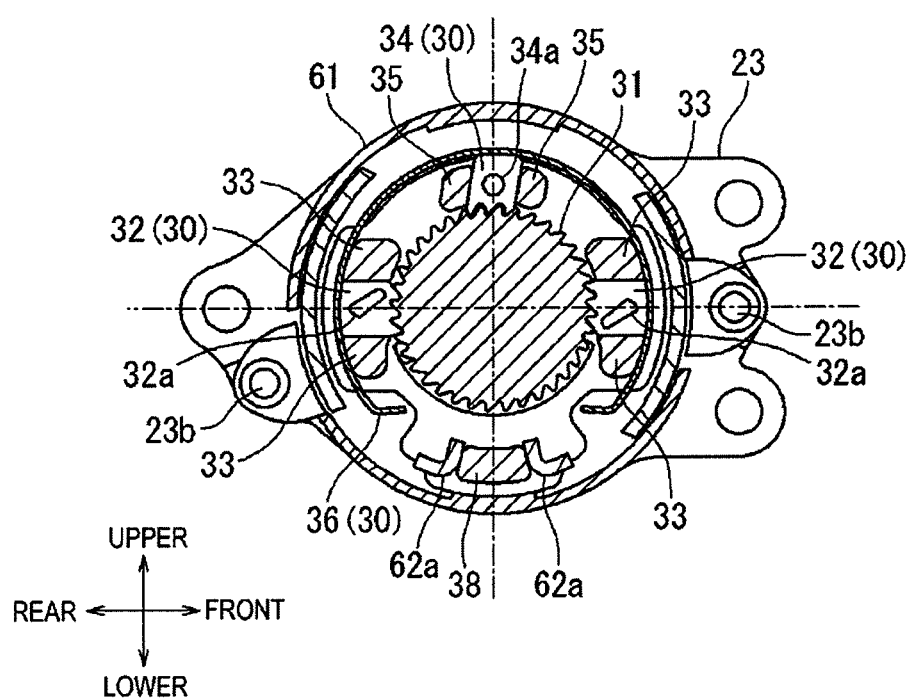
FIG. 13 is a sectional view taken along a line XIII-XIII in FIG. 8.

FIGS. 11 to 13 illustrate a state of the neutral position in which the operation handle 20 is not rotated, and the input member 41 and the pawl operating member 37 are not rotated, either. At this time, as illustrated in FIG. 11, the drive lever 52 is biased by the spring 42b, and the engaging end part 52a is engaged with the claw of the ratchet wheel 51. Further, as illustrated in FIGS. 12 and 13, the main pawls 32 are in a state of being pressed by the ring spring 36 and engaged with the ratchet wheel 31. In this state, the engaging projections 37d are engaged with the engaging protrusions 32a and maintained in a state of being engaged with the ratchet wheel 31. Further, the engaging protrusion 34a is pressed toward the ratchet wheel 31 by the engaging projection 37g, such that the sub-pawl 34 is engaged with the ratchet wheel 31. Therefore, the lock mechanism 30 is in a locked state, the ratchet wheel 31 is not rotated, and the height of the seat 1 is not changed.

In the state where the operation handle 20 is in the neutral position as described above, the rotation angle of the pawl operating member 37 is aligned accurately to the reference position by aligning the projection 37a with the projection 38.

Figure 14:
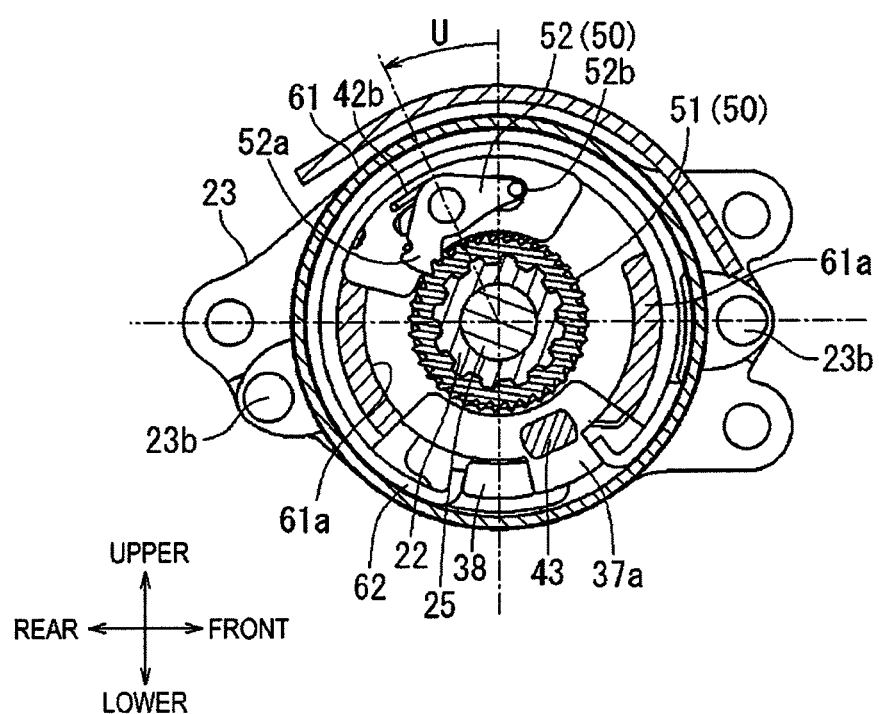
FIG. 14 is a sectional view similar to FIG. 11 illustrating a state in which an operation handle is operated to a lifting side by a first angle.
Figure 15:
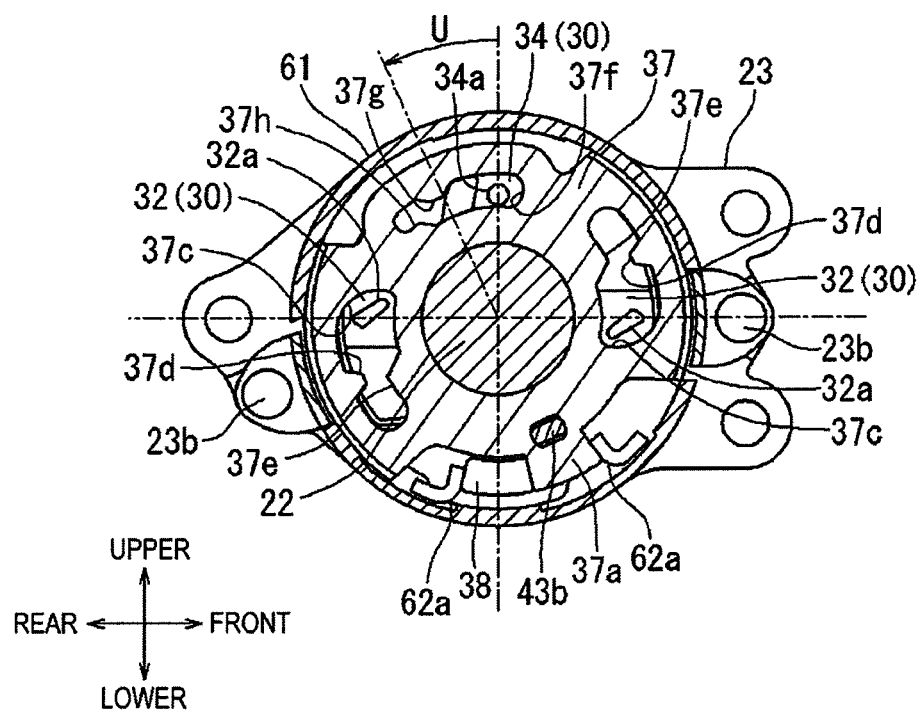
FIG. 15 is a sectional view similar to FIG. 12 illustrating the state in which the operation handle is operated to the lifting side by the first angle.
Figure 16:
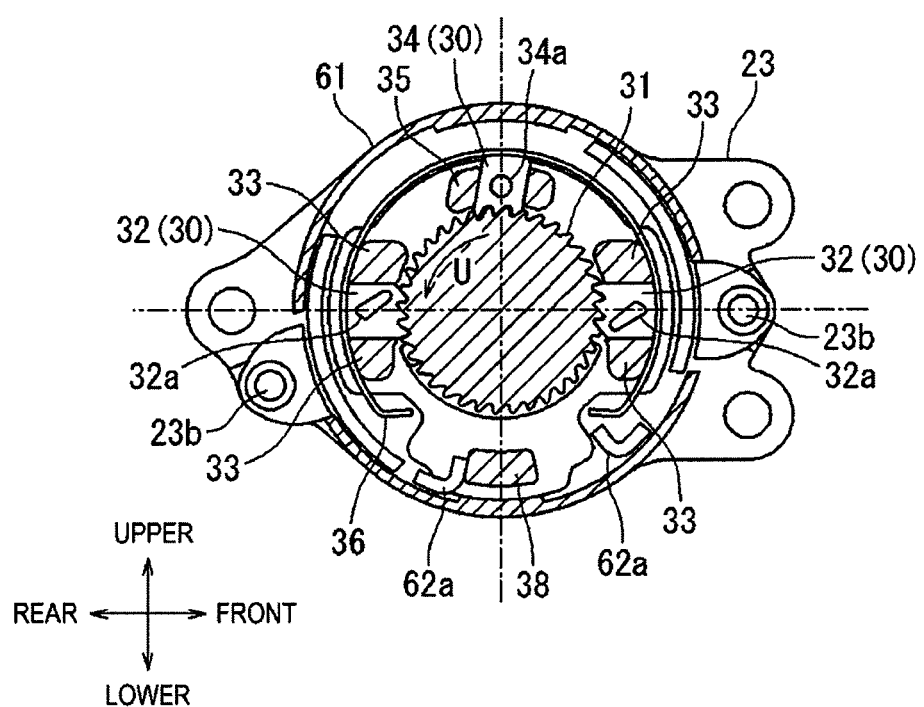
FIG. 16 is a sectional view similar to FIG. 13 illustrating the state in which the operation handle is operated to the lifting side by the first angle.

FIGS. 14 to 16 illustrate a state where the operation handle 20 is operated by a first angle U in a seat lifting direction. At this time, as illustrated in FIG. 14, the drive lever 52 rotates the ratchet wheel 51 by the first angle U in a state where the engaging end part 52a is engaged with the claw of the ratchet wheel 51. Further, as illustrated in FIG. 15, the pawl operating member 37 is also rotated by the first angle U via the coupling member 42. As a result of rotating the pawl operating member 37, the engaging protrusions 32a of the main pawls 32 are not pressed by the engaging projections 37d. The engaging protrusion 34a of the sub-pawl 34 is also not pressed by the engaging projection 37g. Therefore, as illustrated in FIG. 16, the main pawls 32 and the sub-pawl 34 are biased in a direction to engage with the ratchet wheel 31 by the ring spring 36. In this state, the ratchet wheel 31 rotated together with the ratchet wheel 51 in an arrow U direction can be rotated without being engaged with the claws of the main pawls 32 and the sub-pawl 34. As a result, the pinion gear 18 is rotated to lift the seat 1 by an amount corresponding to the first angle U.

When the operation of the operation handle 20 in the seat lifting direction is ended, the main pawls 32 and the sub-pawl 34 are engaged with the ratchet wheel 31 by the biasing of the ring spring 36. Further, the pawl operating member 37 is returned to the neutral position, and the engaging projections 37d and the engaging projection 37g of the pawl operating member 37 are accordingly engaged with the engaging protrusions 32a of the main pawls 32 and the engaging protrusion 34a of the sub-pawl 34 to lock the ratchet wheel 31.

Figure 17:
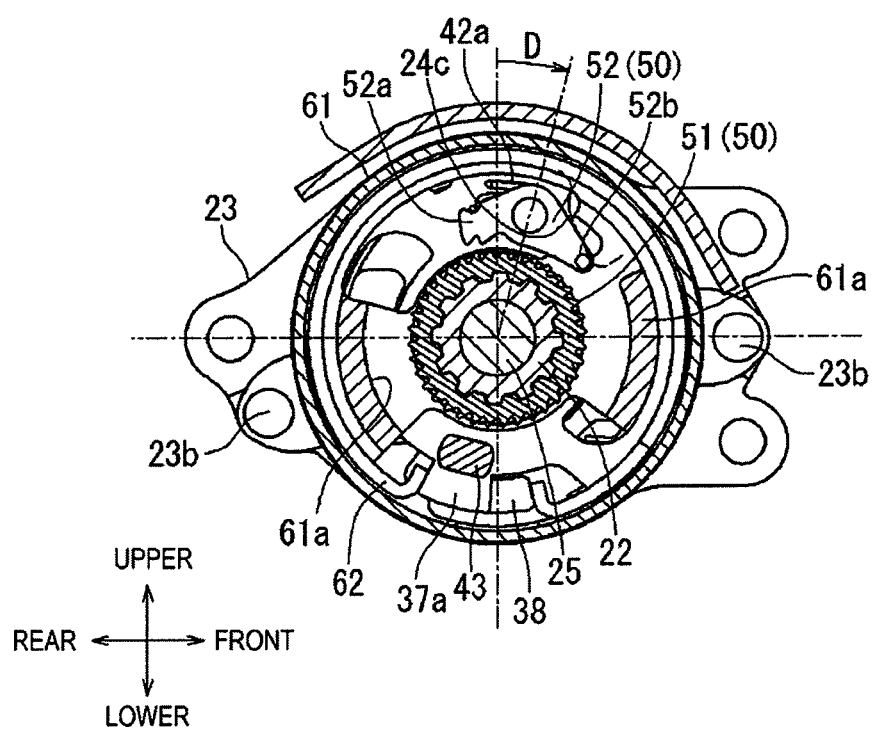
FIG. 17 is a sectional view similar to FIG. 11 illustrating a state in which the operation handle is operated to a lowering side by a second angle.
Figure 18:
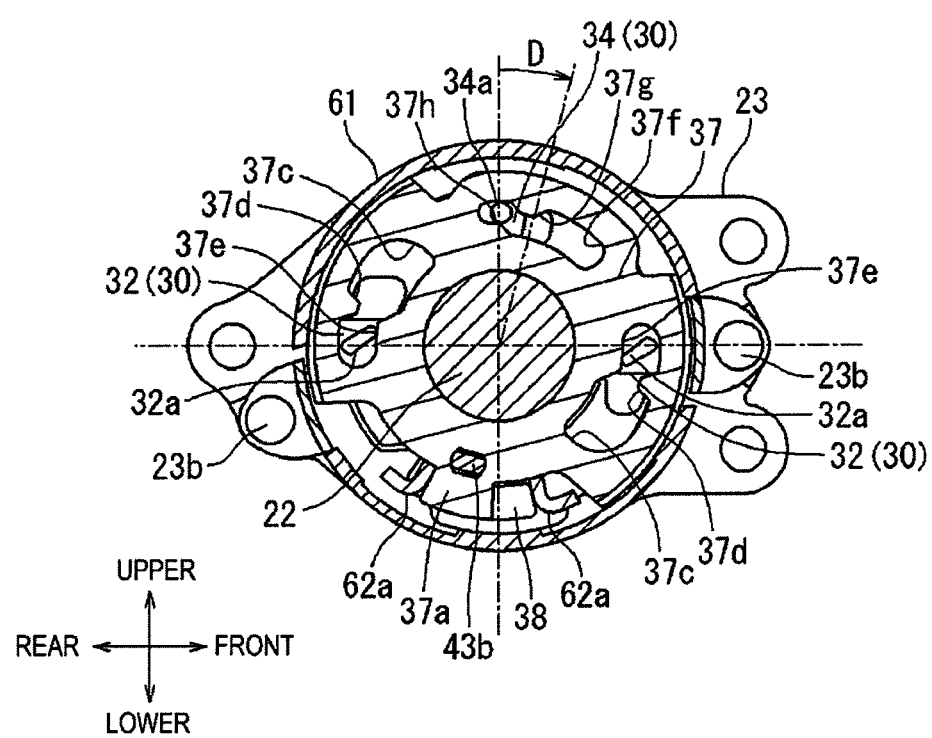
FIG. 18 is a sectional view similar to FIG. 12 illustrating the state in which the operation handle is operated to the lowering side by the second angle.
Figure 19:
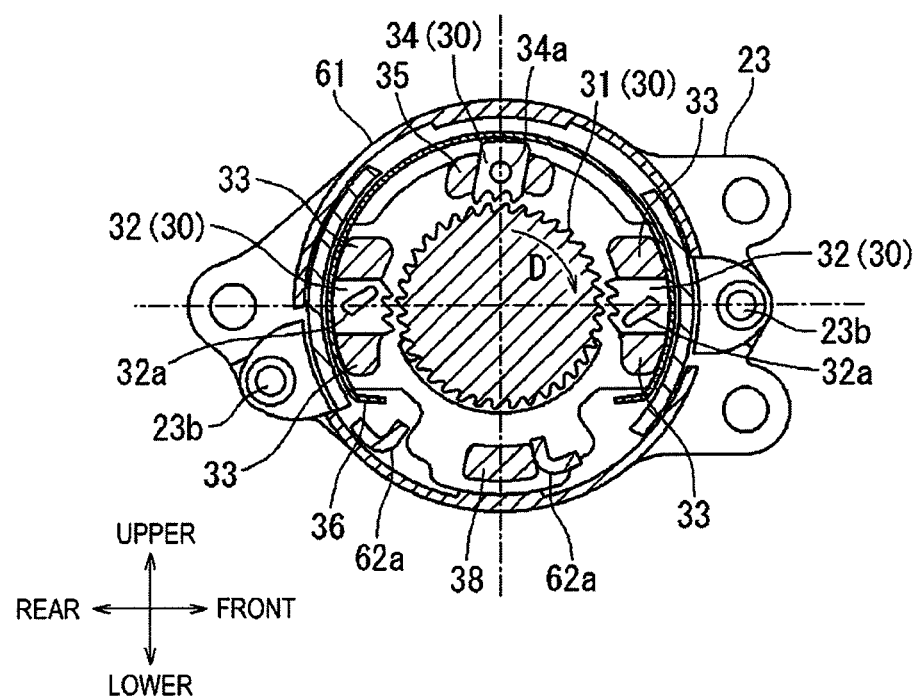
FIG. 19 is a sectional view similar to FIG. 13 illustrating the state in which the operation handle is operated to the lowering side by the second angle.

FIGS. 17 to 19 illustrate a state in which the operation handle 20 is operated by a second angle D in a seat lowering direction from the neutral position, and the input member 41 and the pawl operating member 37 are rotated by the second angle D in the seat lowering direction from the neutral position. When the input member 41 is rotated by the second angle D, as illustrated in FIG. 17, the engaging part 52b of the drive lever 52 engages with the engaging piece 24c of the cover 24, the drive lever 52 is rotated against the biasing force of the spring 42a, and the engaging end part 52a is disengaged from the pawl of the ratchet wheel 51. Therefore, the ratchet wheel 51 is not driven by the drive lever 52.

Meanwhile, as a result of rotating the pawl operating member 37, as illustrated in FIG. 18, the engaging protrusions 32a of the main pawls 32 are not pressed by the engaging projections 37d but engaged with the engaging projection 37e. Accordingly, the main pawls 32 are disengaged from the ratchet wheel 31. Further, the engaging protrusion 34a of the sub-pawl 34 is not pressed by the engaging projection 37g but moved along an inclined surface of the engaging projection 37h. Accordingly, the sub-pawl 34 is disengaged from the ratchet wheel 31. Therefore, in this state, as illustrated in FIG. 19, the locked state of the ratchet wheel 31 is released and the ratchet wheel 31 is freely rotatable. As a result, the pinion gear 18 is rotated and the seat 1 is lowered by a weight thereof. At this time, the damper 19 connected to the pinion gear 18 functions such that a lowering speed of the seat 1 is appropriately suppressed.

When the operation of the operation handle 20 in the seat lowering direction is ended, the pawl operating member 37 is returned to the neutral position, and the main pawls 32 and the sub-pawl 34 are accordingly engaged with the ratchet wheel 31 by the biasing of the ring spring 36. Further, the engaging projections 37d and the engaging projection 37g of the pawl operating member 37 are engaged with the engaging protrusions 32a of the main pawls 32 and the engaging protrusion 34a of the sub-pawl 34 to lock the ratchet wheel 31.

As described above, when lifting the seat 1, the operation handle 20 is operated to rotate in the lifting direction, and the ratchet wheel 51 is rotated in accordance with the operation amount, such that the seat 1 is lifted. When the lifting amount is insufficient, the seat 1 can be lifted by further repeating the rotation operation of the operation handle 20.

Figure 21:
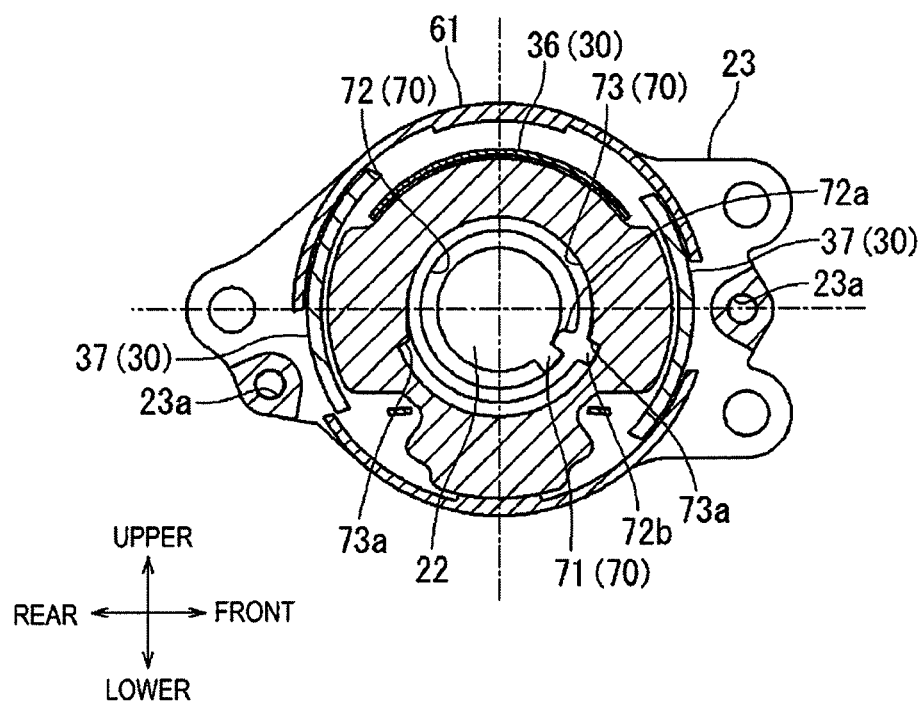
FIG. 21 is a sectional view similar to FIG. 20 illustrating a state in which the seat is at an upper limit position.

When the ratchet wheel 31 and the rotation shaft 22 are rotated, as illustrated in FIG. 20, the projection 71 is also rotated. The ring 72 is not rotated while the first engaging part 72a of the ring 72 is positioned rearward in the rotation direction. However, when rotation angles of the ratchet wheel 31 and the rotation shaft 22 increase, and the first engaging part 72a is located in front of the projection 71 and pressed by the projection 71, the ring 72 is rotated together with the ratchet wheel 31 and the rotation shaft 22. Eventually, when the height of the seat 1 reaches an upper limit position, as illustrated in FIG. 21, the second engaging part 72b of the ring 72 comes into contact with the front contact surface parts 73a, such that the rotation of the ring 72 is restricted. Accordingly, the projection 71 cannot be rotated by the first engaging part 72a, and the rotation of the ratchet wheel 31 and the rotation shaft 22 is restricted. Therefore, the pinion gear 18 cannot be rotated, and the lifting of the seat 1 is stopped.

When lowering the seat, the operation handle 20 is operated to rotate in the lowering direction, and the locked state of the ratchet wheel 31 by the main pawls 32 and the sub-pawl 34 is released, such that the seat 1 is lowered.

Figure 22:
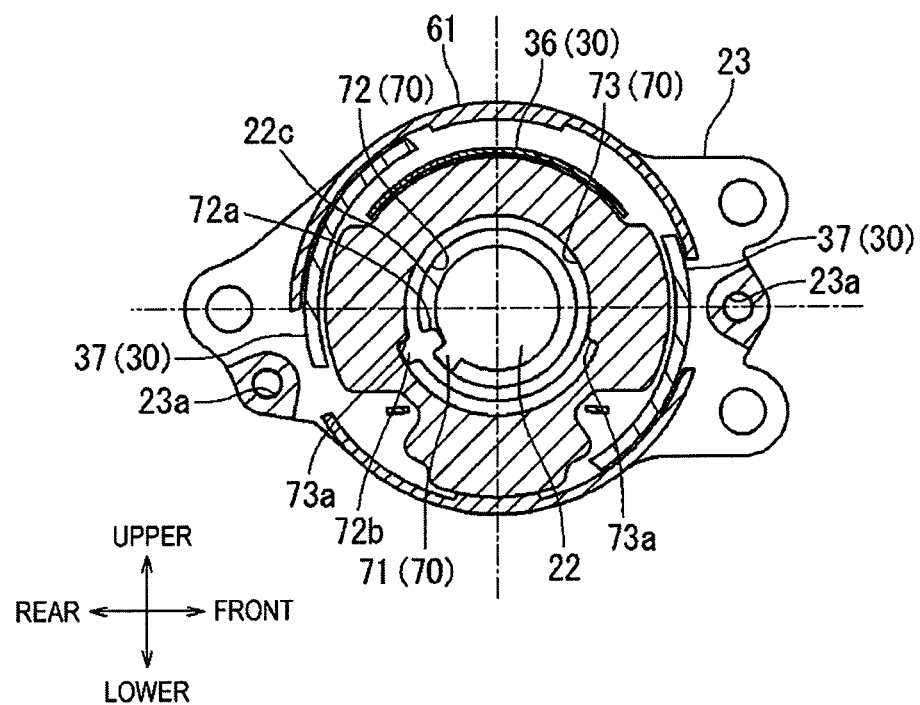
FIG. 22 is a sectional view similar to FIG. 20 illustrating a state in which the seat is at a lower limit position.

FIG. 22 illustrates a state in which the height of the seat 1 reaches a lower limit position. Before reaching the lower limit position, the first engaging part 72a of the ring 72 is pressed by the projection 71 and rotated clockwise in FIG. 22, such that the second engaging part 72b is in contact with the rear contact surface parts 73a to restrict the rotation. Therefore, the rotation of the ratchet wheel 31 and the rotation shaft 22 is restricted and the pinion gear 18 cannot be rotated, such that the lowering of the seat 1 is stopped.

Effect of First Embodiment

According to the first embodiment, the input member 41 is supported and rotated by the rotation shaft 22 via the caulking pin 25 when the operation handle 20 is operated. At this time, the input member 41 is fixed to the top plate part 24e via the caulking pin 25, and is supported by the support member 23 via the top plate part 24e in the thrust direction of the rotary shaft 22. Therefore, the operation handle 20 can be prevented from wobbling in the thrust direction during operation.

The drive lever 52 and the protruding pin 43 are directly fixed to the input member 41, and only the input member 41 is held between the caulking pin 25 and the top plate part 24e. Accordingly, as compared with a case where another member is held between the caulking pin 25 and the top plate part 24e together with the input member 41, a gap in the rotation shaft direction of the input member 41 held between the caulking pin 25 and the top plate part 24e can be minimized. Therefore, wobbling of the rotary shaft 22 in the thrust direction can be suppressed when the operation handle 20 is operated.

Configuration of Second Embodiment

Figure 23:
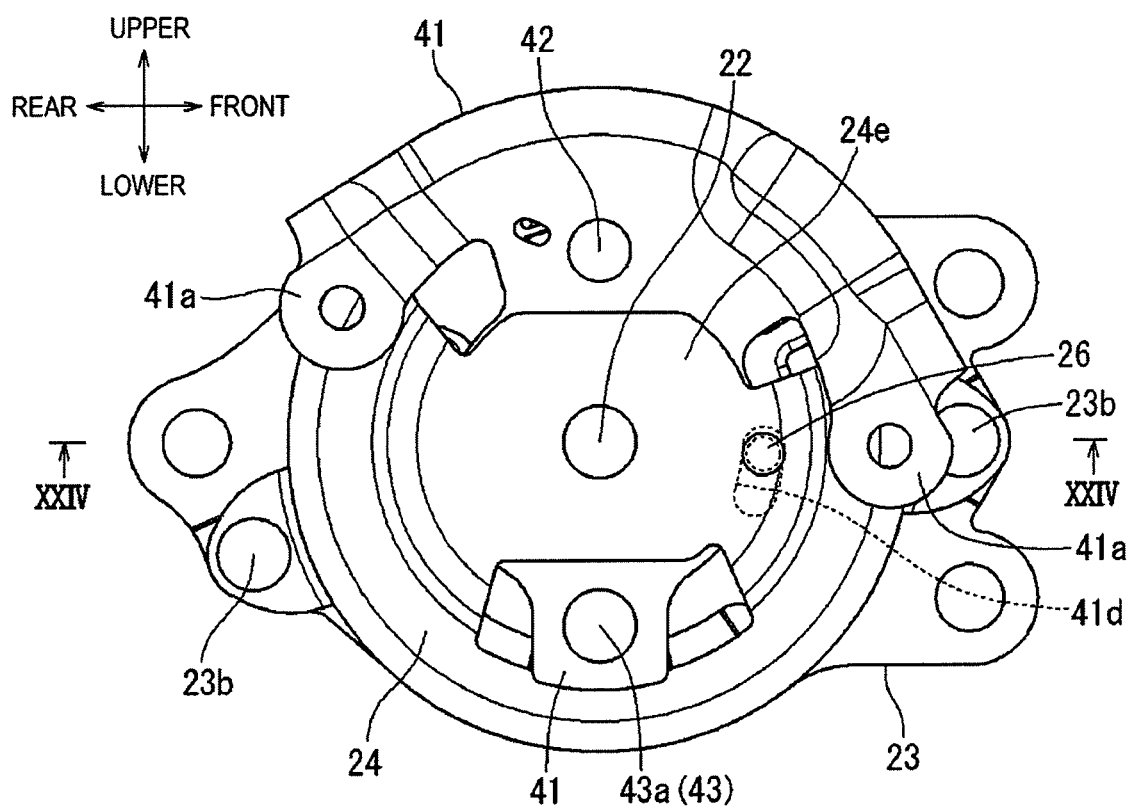
FIG. 23 is a front view illustrating a lifter device according to a second embodiment of the disclosure.
Figure 24:
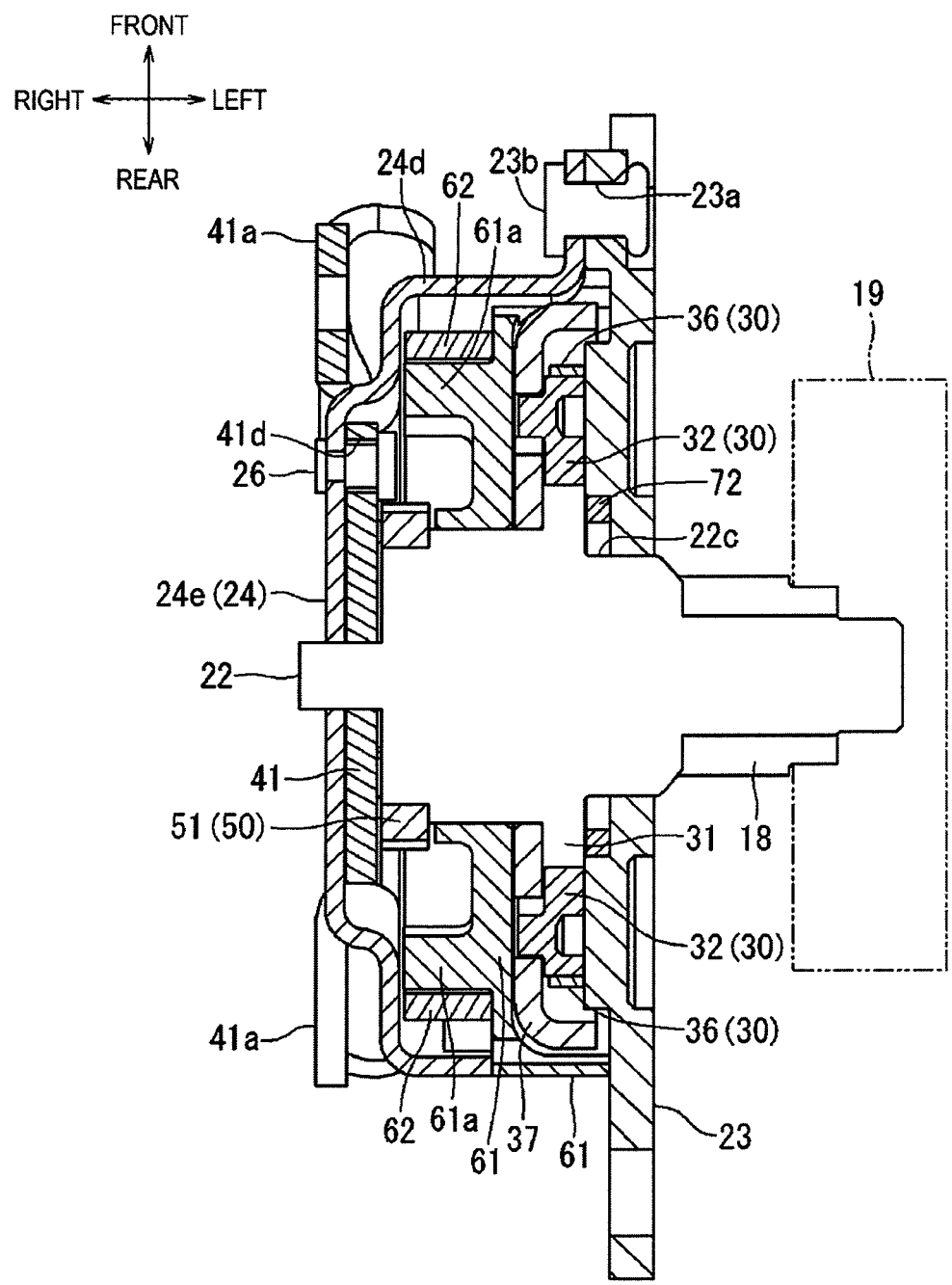
FIG. 24 is a sectional view taken along a line XXIV-XXIV in FIG. 23.

FIGS. 23 and 24 illustrate a second embodiment of the disclosure. The second embodiment is characterized, as compared with the first embodiment, in that the input member 41 is fixed to the top plate part 24e not at the rotation center of the input member 41 but on an outer peripheral side thereof. Other configurations are the same, and descriptions of the same parts are not repeated.

In the second embodiment, the rotation shaft 22 penetrates the input member 41 and the top plate part 24e, and the input member 41 is rotatable about the rotation shaft 22. Further, an outer peripheral side of the rotation center of the input member 41 is fixed to the top plate part 24e via a caulking pin 26. Here, the input member 41 includes an arc-shaped guide hole 41d corresponding to the caulking pin 26. The guide hole 41d is centered on the rotating shaft 22 such that the input member 41 is rotatable about the rotation shaft 22. The fixing position via the caulking pin 26 is set to a front side of the rotation center of the input member 41. The caulking pin 26 corresponds to a fixing member of the disclosure.

The input member 41 is fixed to the top plate part 24e by the caulking pin 26 such that the input member 41 is prevented from wobbling in the thrust direction during operation of the operation handle 20. However, it is necessary to consider that the increasing sliding resistance with the top plate part 24e when the input member 41 is rotated does not affect the rotation operation of the input member 41. Accordingly, the top plate part 24e is firmly crimped via the caulking pin 26, and the input member 41 held between the top plate part 24e and a step part of the caulking pin 26 is crimped with a slight gap.

In the second embodiment, the input member 41 is fixed to the top plate part 24e via the caulking pin 26 at only one position on the outer peripheral side of the rotation center of the input member 41. However, the fixing may be performed at two positions. In this case, the two positions are preferably located opposite with the rotation center sandwiched therebetween. Thus, wobbling can be further suppressed when the operation handle 20 is operated in the case where the fixing is performed at two positions.

Effect of Second Embodiment

In the second embodiment, the input member 41 is fixed to the top plate part 24e via the caulking pin 26, and is supported by the support member 23 via the top plate part 24e in the thrust direction of the rotation shaft 22, which is similar to the first embodiment. Accordingly, wobbling of the rotary shaft 22 in the thrust direction can be suppressed when the operation handle 20 is operated.

The wobbling of the operation handle 20 occurs when a tip end thereof extending to a front side of the operation handle 20, which is fixed to the input member 41 via the coupling part 41a, swings in a left-right direction. In the second embodiment, since the input member 41 is fixed to the top plate part 24e via the caulking pin 26 at only one position on the outer peripheral side of the rotation center of the input member 41, and the direction in which the fixing position is separated from the rotation center of the input member 41 coincides with the direction in which the operation handle 20 extends, the swinging of the operation handle 20 can be effectively suppressed and wobbling of the operation handle 20 can be effectively suppressed.

Configuration of Third Embodiment

Figure 25:
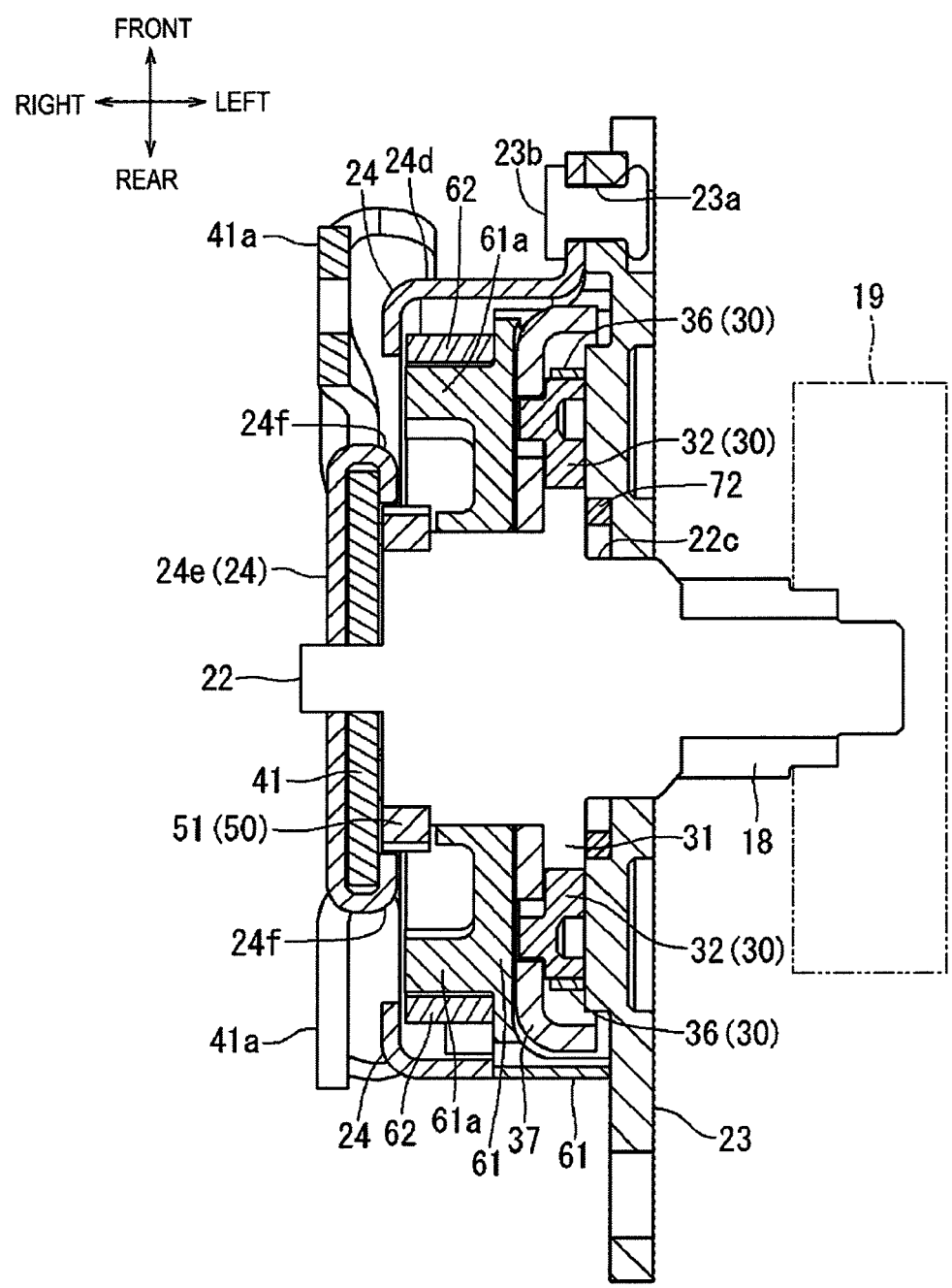
FIG. 25 is a sectional view similar to FIG. 24 illustrating a lifter device according to a third embodiment of the disclosure.

FIG. 25 illustrates a third embodiment of the disclosure. The third embodiment is characterized, as compared with the second embodiment (FIGS. 23, 24), in that the input member 41 is fixed to the top plate part 24e by deforming and crimping a part of the top plate part 24e without using the caulking pin 26. Other configurations are the same, and descriptions of the same parts are not repeated.

In the third embodiment, a boundary part between the top plate part 24e of the cover 24 and the pair of leg parts 24d is partially cut along an outer peripheral shape of the cover 24. Edge parts of these cut parts on the top plate part 24e side are bent to a left side, such that an outer peripheral side of the input member 41 is enwrapped and crimped to form a caulking part 24f. Therefore, the degree of crimping in the caulking part 24f can be relatively rotated with respect to the top plate part 24e of the input member 41, such that wobbling of the rotary shaft 22 in the thrust direction can be suppressed when the operation handle 20 is operated. The caulking part 24f corresponds to a fixing member of the disclosure.

Effect of Third Embodiment

In the third embodiment, the input member 41 is crimped and fixed via the caulking part 24f, and is supported by the support member 23 via the top plate part 24e in the thrust direction of the rotation shaft 22, which is similar to the second embodiment. Accordingly, wobbling of the rotary shaft 22 in the thrust direction can be suppressed when the operation handle 20 is operated.

Further, since the caulking part 24f of the input member 41 via the top plate part 24e is formed in a front-rear direction of the rotation center of the input member 41, the direction in which a pair of caulking parts 24f are connected coincides with the direction in which the operation handle 20 extends, and accordingly the swinging of the operation handle 20 can be effectively suppressed and wobbling of the operation handle 20 can be effectively suppressed.

Configuration of Fourth Embodiment

Figure 26:
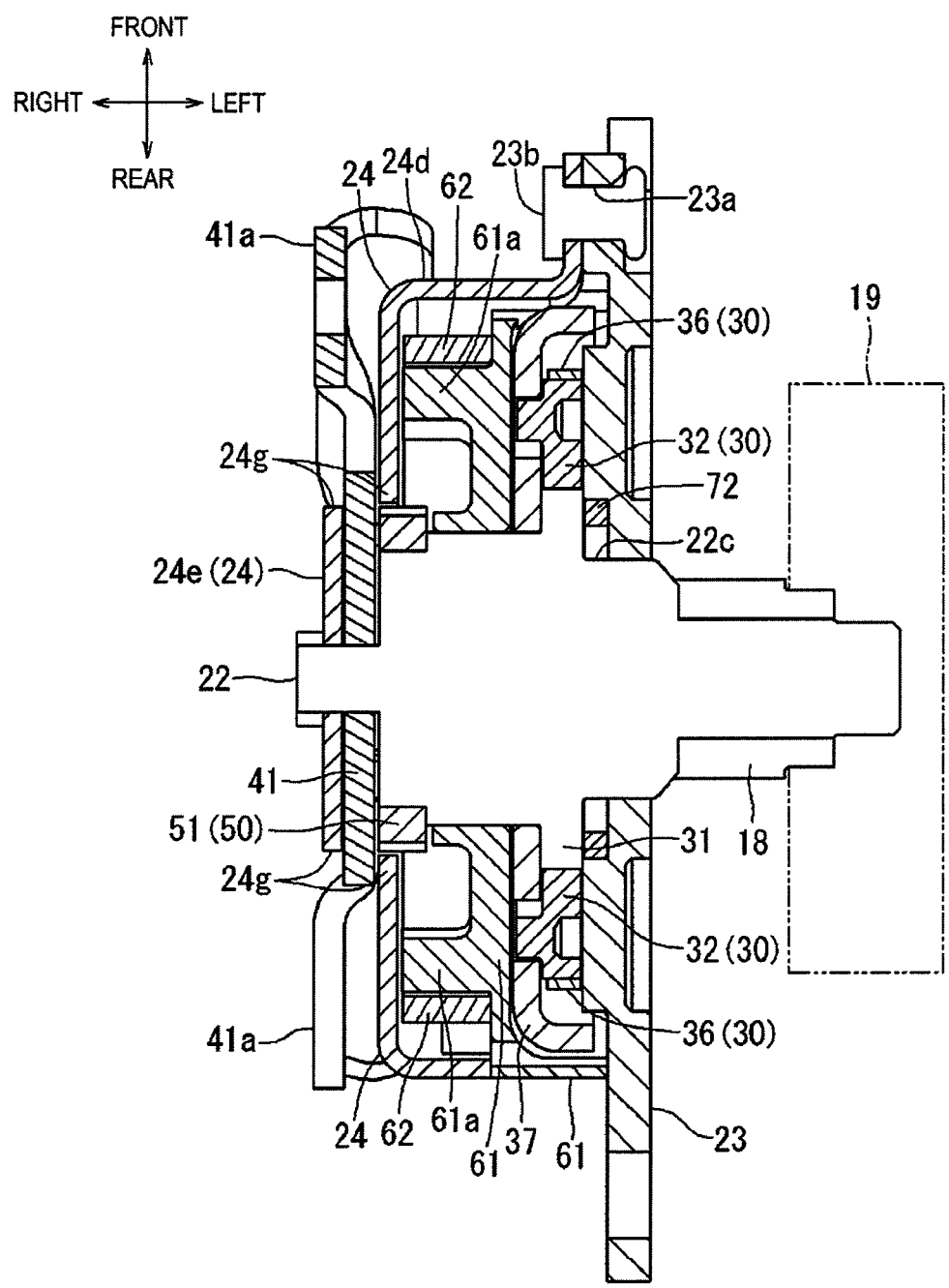
FIG. 26 is a sectional view similar to FIG. 24 illustrating a lifter device according to a fourth embodiment of the disclosure.

FIG. 26 illustrates a fourth embodiment of the disclosure. The fourth embodiment is characterized, as compared with the third embodiment (FIG. 25), in that the input member 41 is fixed to the top plate part 24e by holding the input member 41 between the top plate part 24e of the cover 24 and the leg parts 24d. Other configurations are the same, and descriptions of the same parts are not repeated.

In the fourth embodiment, a boundary part between the top plate part 24e of the cover 24 and the pair of leg parts 24d is partially cut along an outer peripheral shape of the cover 24. The cut parts 24g on the top plate part 24e side and the leg parts 24d side extend along left and right surfaces of the input member 41, respectively. Accordingly, left and right surfaces at front and rear end parts of the rotation center of the input member 41 are held by the cut parts 24g on the top plate part 24e side and the leg parts 24d side, and the input member 41 is fixed to the top plate part 24e. Therefore, the degree of holding the input member 41 via the cut parts 24e is configured such that the top plate part 24e is rotatable relative to the input member 41 and wobbling of the rotary shaft 22 in the thrust direction is suppressed when the operation handle 20 is operated. The cut parts 24g correspond to a fixing member of the disclosure.

Effect of Fourth Embodiment

In the fourth embodiment, the input member 41 is fixed to the top plate part 24e, and is supported by the support member 23 via the top plate part 24e in the thrust direction of the rotation shaft 22, which is similar to the third embodiment. Accordingly, wobbling of the rotary shaft 22 in the thrust direction can be suppressed when the operation handle 20 is operated.

Since the position where the input member 41 is held and fixed to the top plate part 24e via the cut parts 24g is the front-rear direction of the rotation center of the input member 41, and the direction in which the fixing position of the input member 41 via the cut parts 24g is connected coincides with the direction in which the operation handle 20 extends, the swinging of the operation handle 20 can be effectively suppressed and wobbling of the operation handle 20 can be effectively suppressed.

Configuration of Fifth Embodiment

Figure 27:
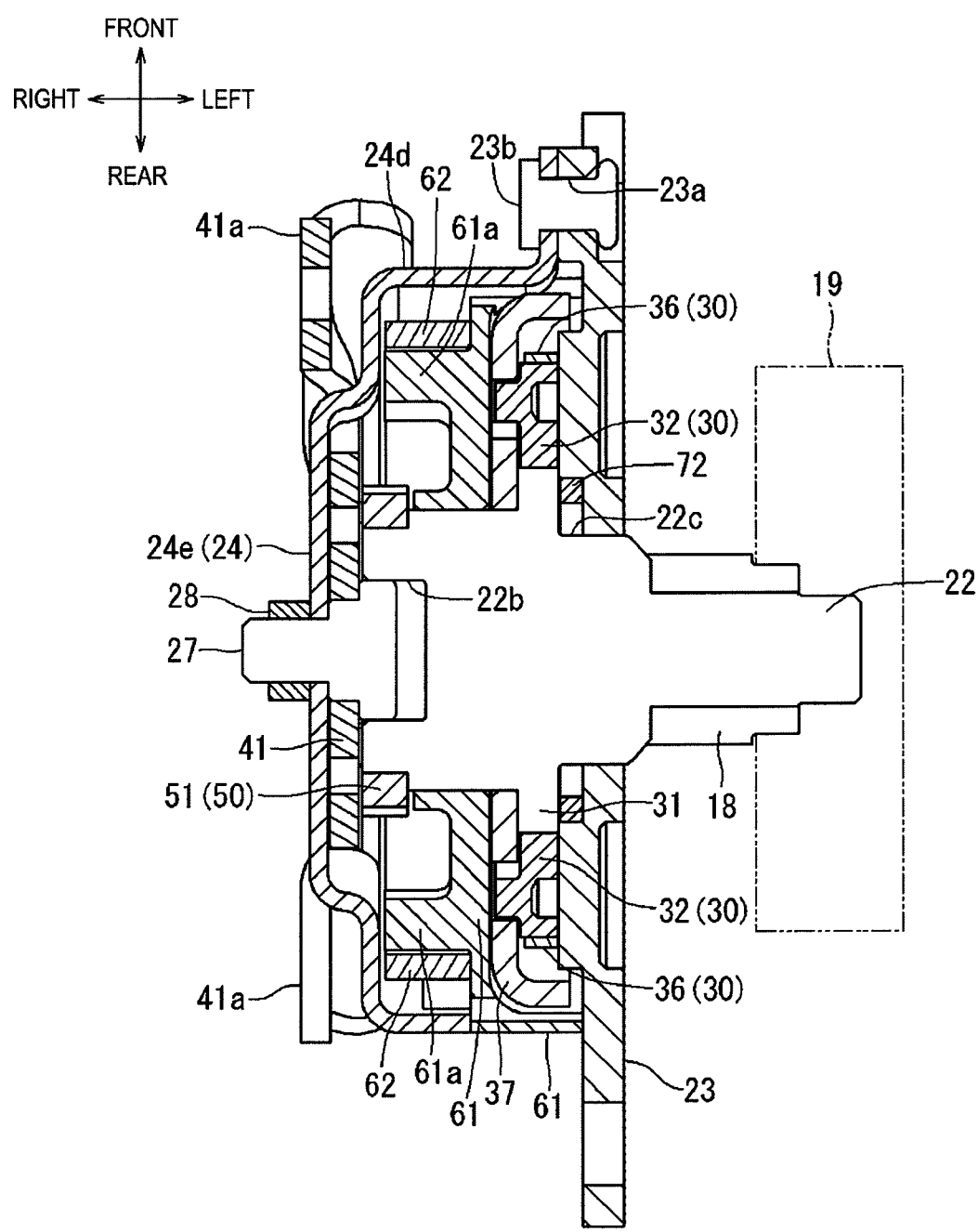
FIG. 27 is a sectional view similar to FIG. 24 illustrating a lifter device according to a fifth embodiment of the disclosure.

FIG. 27 illustrates a fifth embodiment of the disclosure. The fifth embodiment is characterized, as compared with the first embodiment (FIG. 8), in that the input member 41 is fixed to the top plate part 24e via a stepped bolt 27 and a nut 28 instead of the caulking pin 25. Other configurations are the same, and descriptions of the same parts are not repeated.

In the fifth embodiment, the input member 41 is fixed to the top plate part 24e by fastening the nut 28 to the stepped bolt 27 with the input member 41 and the top plate part 24e interposed therebetween. A head of the stepped bolt 27 is slidably fitted into the fitting hole 22b formed at a right end of the rotation shaft 22. Therefore, the top plate part 24e is firmly fixed by the stepped bolt 27 and the nut 28, and the input member 41 is loosely held between a stepped part of the stepped bolt 27 and the top plate part 24e without directly receiving a fastening force of the stepped bolt 27 and the nut 28. Therefore, the input member 41 is fixed to the top plate part 24e in a state of being able to be rotated relative to the top plate part 24e, and wobbling of the rotary shaft 22 in the thrust direction is suppressed when the operation handle 20 is operated. The stepped bolt 27 and the nut 28 correspond to a fixing member of the disclosure.

Effect of Fifth Embodiment

In the fifth embodiment, the input member 41 is fixed to the top plate part 24e, and is supported by the support member 23 via the top plate part 24e in the thrust direction of the rotation shaft 22, which is similar to the fourth embodiment. Accordingly, wobbling of the rotary shaft 22 in the thrust direction can be suppressed when the operation handle 20 is operated.

Configuration of Sixth Embodiment

Figure 28:
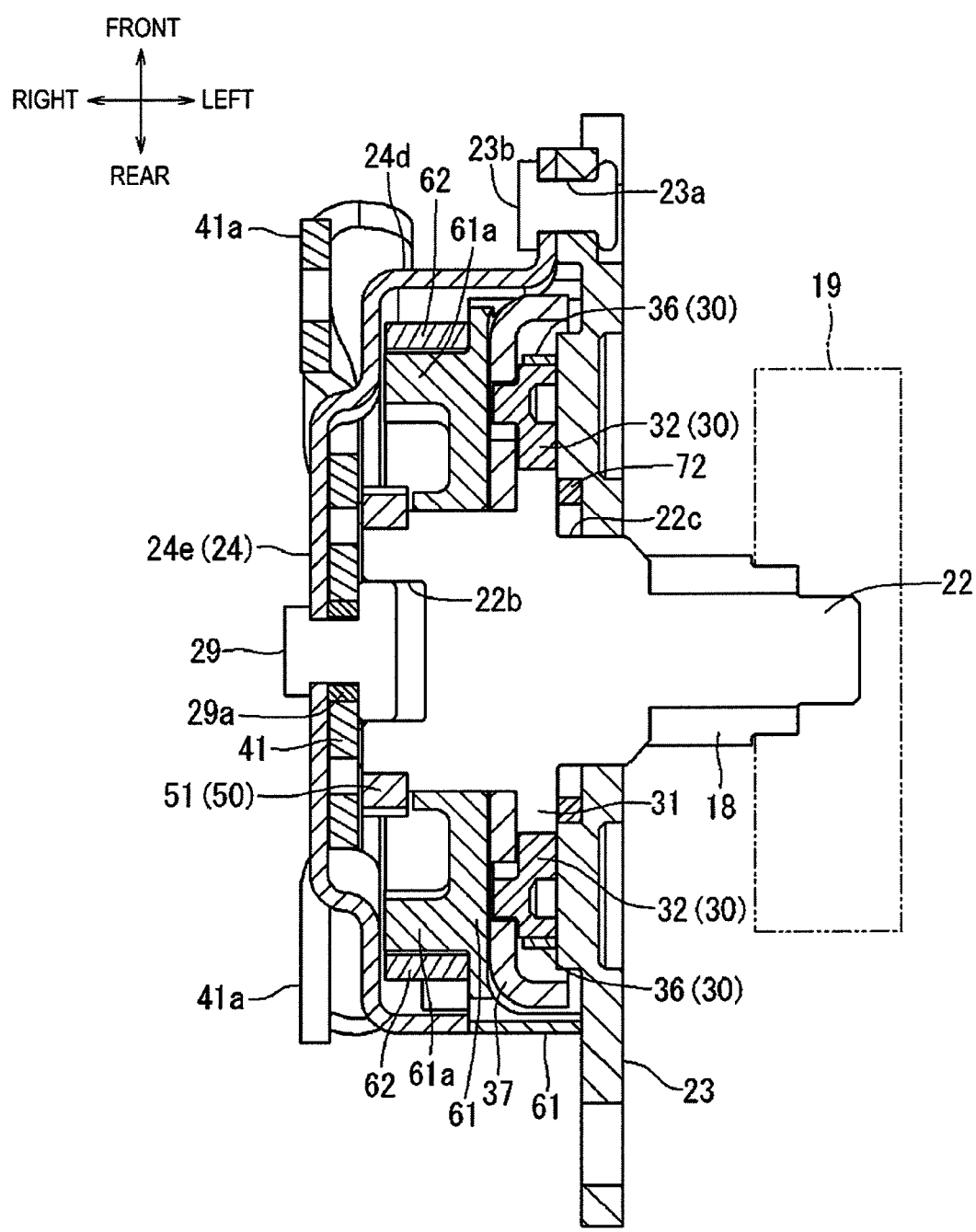
FIG. 28 is a sectional view similar to FIG. 24 illustrating a lifter device according to a sixth embodiment of the disclosure.

FIG. 28 illustrates a sixth embodiment of the disclosure. The sixth embodiment is characterized, as compared with the first embodiment (FIG. 8), in that a collar 29a is used in a stepped part of a caulking pin 29, such that the input member 41 is fixed to the top plate part 24e. Other configurations are the same, and descriptions of the same parts are not repeated.

In the sixth embodiment, of the top plate part 24e is firmly crimped by the caulking pin 29 via the collar 29a. The collar 29a is sandwiched between a step part of the caulking pin 29 and the top plate part 24e such that a crimping force by the caulking pin 29 does not apply strongly to the input member 41. Therefore, the input member 41 is loosely held in a gap between the step part of the caulking pin 29 and the top plate part 24e determined by the height (left-right dimension) of the collar 29a. The caulking pin 29 and the collar 29a correspond to a fixing member of the disclosure.

Effect of Sixth Embodiment

In the sixth embodiment, the input member 41 is fixed to the top plate part 24e, and is supported by the support member 23 via the top plate part 24e in the thrust direction of the rotation shaft 22, which is similar to the fourth embodiment. Accordingly, wobbling of the rotary shaft 22 in the thrust direction can be suppressed when the operation handle 20 is operated.

OTHER EMBODIMENTS

Although specific embodiments have been described above, the disclosure is not limited to those appearances and configurations, and modifications, additions and deletions can be made thereto. For example, in the embodiments, the support member is shaped like a container, but may also be a plate-like member instead of a container. Further, in the first, fifth, and sixth embodiments, a head part of a fixing member such as the caulking pin 25 is fitted into the fitting hole 22b of the rotation shaft 22. However, a fitting hole facing the rotation shaft 22 side may be formed to the head of the fixing member by reversing the male/female relationship in the fitting, and a tip end of the rotation shaft 22 is fitted into the fitting hole.

In the above embodiments, the disclosure is applied to a seat of an automobile, but may also be applied to a seat mounted on an airplane, a ship, a train or the like, or a sheet installed in a movie theater or the like.

The disclosure provides illustrative, non-limiting examples as follows:

According to a first aspect of the disclosure, there is provided a lifter device including: a pinion gear meshing with an input gear of a link mechanism for lifting and lowering a seat; and a rotation control device configured to control rotation of the pinion gear, the rotation control device including: a rotation shaft configured to rotate in synchronization with the pinion gear; a support member rotatably supporting the rotation shaft; a rotation drive mechanism provided to the rotation shaft, the rotation drive mechanism being configured to rotationally drive the rotation shaft in a lifting direction when an operation handle for lifting and lowering the seat is operated to lift the seat, and to bring the rotation shaft into a freely rotatable state without rotationally driving the rotation shaft when the operation handle is operated to lower the seat; a lock mechanism provided to the rotation shaft, the lock mechanism being configured to lock the rotation of the rotation shaft at an operation end position of the operation handle when the operation handle is operated to lift the seat, and to bring the rotation shaft into a freely rotatable state without locking the rotation of the rotation shaft when the operation handle is operated to lower the seat; an input member configured to be rotated about the rotation shaft in synchronization with the operation handle, and to input an operation force of the operation handle to the rotation drive mechanism and the lock mechanism; and a fixing member slidably fixing the input member to the support member.

According to the first aspect, since the input member rotated in synchronization with the operation handle is fixed to the support member, the input member is stably supported by the support member in the axial direction. Accordingly, wobbling of the rotation handle in the thrust direction of the rotation shaft can be suppressed when the operation handle is swung.

According to a second aspect of the disclosure, there is provided the lifter device according to the first aspect, wherein the support member has a container-like shape for accommodating the rotation shaft, the rotation drive mechanism, and the lock mechanism therein, and wherein the input member is configured by one plate body disposed from inside to outside of the container of the supporting member.

According to the second aspect, since the input member is configured by one plate body, an excessive gap due to assembly variation of components, in the case where a plurality of components are stacked, can be prevented from occurring in the rotation shaft direction of the input member. Accordingly, wobbling of the rotation handle in the thrust direction of the rotation shaft can be suppressed when the operation handle is operated.

According to a third aspect of the disclosure, there is provided the lifter device according to the second aspect, further including: a lock control member configured to transmit a rotation state of the input member to the lock mechanism to control a lock state of the lock mechanism, wherein the lock control member protrudes toward the lock mechanism and is directly coupled to an outer peripheral side of a rotation center of the input member.

According to the third aspect, the lock control member protruding toward the lock mechanism is directly coupled to the input member. Therefore, the input member can be easily inserted into the container during assembling in a state in which the lock control member is not coupled.

According to a fourth aspect of the disclosure, there is provided the lifter device according to the second or third aspect, further including: a drive member configured to transmit rotation of the input member to the rotation drive mechanism to cause the rotation drive mechanism to rotate the rotation shaft in a lifting direction, wherein the drive member is directly coupled to an outer peripheral side of a rotation center of the input member and to a rotation drive mechanism side surface of the input member.

According to the fourth aspect, the drive member is directly coupled to the input member. Therefore, the input member can be easily inserted into the container during assembling in a state in which the drive member is not coupled.

According to a fifth aspect of the disclosure, there is provided the lifter device according to any one of the first to fourth aspects, wherein the fixing member is rotatably fitted to a fitting hole of the rotation shaft on a rotation center line of the rotation shaft.

According to the fifth aspect, the input member is slidably fixed to the fixing member having a size to be fitted into the fitting hole of the rotation shaft. Accordingly, when being rotated in response to the rotation shaft, the input member slides with respect to the fixing member. The sliding area of the input member with the fixing member is smaller than that in a case where the input member slides directly on the rotation shaft. Accordingly, sliding resistance during operation of the operation handle is suppressed, and operability of the operation handle is improved. Further, the fixing member can function as a part of the rotation shaft.

What is claimed is:

1. A lifter device comprising:
    a pinion gear meshing with an input gear of a link mechanism for lifting and lowering a seat; and
    a rotation control device configured to control rotation of the pinion gear, the rotation control device including:
        a rotation shaft configured to rotate in synchronization with the pinion gear, the pinion gear rotates about a same longitudinal axis as the rotation shaft;
        a support member rotatably supporting the rotation shaft;
        a rotation drive mechanism provided to the rotation shaft, the rotation drive mechanism being configured to rotationally drive the rotation shaft in a lifting direction when an operation handle for lifting and lowering the seat is operated to lift the seat, and to bring the rotation shaft into a freely rotatable state without rotationally driving the rotation shaft when the operation handle is operated to lower the seat;
a lock mechanism provided to the rotation shaft, the lock mechanism being configured to lock the rotation of the rotation shaft at an operation end position of the operation handle when the operation handle is operated to lift the seat, and to bring the rotation shaft into a freely rotatable state without locking the rotation of the rotation shaft when the operation handle is operated to lower the seat;
an input member configured to be rotated about the rotation shaft in synchronization with the operation handle, and to input an operation force of the operation handle to the rotation drive mechanism and the lock mechanism; and
a fixing member slidably fixing the input member to the support member.

2. The lifter device according to claim 1,
wherein the support member has a shape configured to accommodate the rotation shaft, the rotation drive mechanism, and the lock mechanism therein, and
wherein the input member is configured by one plate body disposed from inside to outside of the container of the supporting member.

3. The lifter device according to claim 2, further comprising:
a lock control member configured to transmit a rotation state of the input member to the lock mechanism to control a lock state of the lock mechanism,
wherein the lock control member protrudes toward the lock mechanism and is directly coupled to an outer peripheral side of a rotation center of the input member.

4. The lifter device according to claim 2, further comprising:
a drive member configured to transmit rotation of the input member to the rotation drive mechanism to cause the rotation drive mechanism to rotate the rotation shaft in a lifting direction,
wherein the drive member is directly coupled to an outer peripheral side of a rotation center of the input member and to a rotation drive mechanism side surface of the input member.

5. The lifter device according to claim 1,
wherein the fixing member is rotatably fitted to a fitting hole of the rotation shaft on a rotation center line of the rotation shaft.

* * * * *